United States Patent
Ishizuka et al.

(10) Patent No.: US 10,554,087 B2
(45) Date of Patent: Feb. 4, 2020

(54) ROTATING ELECTRIC MACHINE AND METHOD OF MANUFACTURING SAME

(71) Applicant: DENSO CORPORATION, Kariya, Aichi-pref. (JP)

(72) Inventors: Atsuo Ishizuka, Kariya (JP); Hiromitsu Asai, Kariya (JP); Mitsuyuki Hayashi, Kariya (JP); Yoki Tsujimori, Kariya (JP)

(73) Assignee: DENSO CORPORATION, Kariya (JP)

( * ) Notice: Subject to any disclaimer, the term of this patent is extended or adjusted under 35 U.S.C. 154(b) by 370 days.

(21) Appl. No.: 15/447,327

(22) Filed: Mar. 2, 2017

(65) Prior Publication Data
US 2017/0257002 A1    Sep. 7, 2017

(30) Foreign Application Priority Data
Mar. 4, 2016 (JP) ................ 2016-042298

(51) Int. Cl.
*H02K 3/28* (2006.01)
*H02K 3/12* (2006.01)
*H02K 15/00* (2006.01)
*H02K 15/085* (2006.01)

(52) U.S. Cl.
CPC ............ *H02K 3/28* (2013.01); *H02K 3/12* (2013.01); *H02K 15/0068* (2013.01); *H02K 15/085* (2013.01)

(58) Field of Classification Search
CPC ........... H02K 15/0062; H02K 15/0068; H02K 15/08; H02K 15/081; H02K 15/085; H02K 15/049; H02K 3/12; Y10T 29/49009; Y10T 29/49012

USPC .................................................. 310/71, 201
See application file for complete search history.

(56) References Cited

U.S. PATENT DOCUMENTS

| | | | | |
|---|---|---|---|---|
| 6,181,043 B1 * | 1/2001 | Kusase | ..................... | H02K 3/12 310/180 |
| 6,841,913 B2 * | 1/2005 | Gorohata | ................. | H02K 3/12 29/596 |
| 6,915,556 B2 * | 7/2005 | Lenoir | ............... | H02K 15/0056 219/125.11 |
| 8,443,509 B1 * | 5/2013 | De Souza | .......... | H02K 15/0081 29/564.2 |

(Continued)

FOREIGN PATENT DOCUMENTS

| JP | 3303854 B2 | | 7/2002 |
|---|---|---|---|
| JP | 2009193928 | * | 8/2009 |
| JP | 2014-036562 A | | 2/2014 |

*Primary Examiner* — Jermele M Hollington
*Assistant Examiner* — Ahmed Elnakib
(74) *Attorney, Agent, or Firm* — Oliff PLC

(57) ABSTRACT

A rotating electric machine includes a pair of electric conductors for forming a coil and a weld. Each of the electric conductors has an end portion with an end surface. The weld is formed between the end portions of the electric conductors at the end surfaces of the end portions. Moreover, the end portions of the electric conductors are arranged so that parts of the end portions of the electric conductors adjoin each other. At least one of the end portions of the electric conductors has at least one slit formed therein to divide the end surface of the end portion into a plurality of sections. The weld is formed to cover, at least, the adjoining parts of the end portions of the electric conductors and the at least one slit.

12 Claims, 28 Drawing Sheets

(56) References Cited

U.S. PATENT DOCUMENTS

| | | | | |
|---|---|---|---|---|
| 8,584,346 B2* | 11/2013 | Berger | ............... | H02K 15/0081 |
| | | | | 219/156 |
| 10,075,039 B2* | 9/2018 | Ishizuka | ................... | H02K 3/12 |
| 2002/0041129 A1* | 4/2002 | Oohashi | ............. | H02K 15/0056 |
| | | | | 310/179 |
| 2003/0067239 A1* | 4/2003 | Nakamura | ............... | H02K 3/12 |
| | | | | 310/201 |
| 2006/0138883 A1* | 6/2006 | Yagai | ..................... | H02K 3/522 |
| | | | | 310/71 |
| 2006/0232157 A1* | 10/2006 | Ooiwa | ................... | H02K 3/505 |
| | | | | 310/201 |
| 2008/0054750 A1* | 3/2008 | Koike | .................... | B23K 35/02 |
| | | | | 310/206 |
| 2012/0319522 A1* | 12/2012 | Ikeda | ...................... | H02K 3/12 |
| | | | | 310/201 |
| 2014/0225465 A1* | 8/2014 | Goto | ...................... | B23K 9/167 |
| | | | | 29/596 |
| 2015/0214820 A1* | 7/2015 | Geoffrion | .......... | H02K 15/0068 |
| | | | | 219/85.22 |
| 2017/0257002 A1* | 9/2017 | Ishizuka | .......... | H02K 3/12 |
| 2017/0346358 A1* | 11/2017 | Fukuda | .................... | H02K 3/28 |
| 2018/0036836 A1* | 2/2018 | Nakamura | ......... | B23K 26/0604 |
| 2018/0248430 A1* | 8/2018 | Umesaki | ........... | H02K 15/0081 |

* cited by examiner

ROTATING ELECTRIC MACHINE AND METHOD OF MANUFACTURING SAME

CROSS-REFERENCE TO RELATED APPLICATION

This application is based on and claims priority from Japanese Patent Application No. 2016-42298 filed on Mar. 4, 2016, the content of which is hereby incorporated by reference in its entirety into this application.

BACKGROUND

1. Technical Field

The present invention relates to rotating electric machines which have a coil formed by arranging each corresponding pair of end portions of electric conductors to adjoin each other and welding them at end surfaces thereof, and to methods of manufacturing the rotating electric machines.

2. Description of Related Art

There are known rotating electric machines which have a coil formed by arranging each corresponding pair of end portions of electric conductors to adjoin each other and welding them at end surfaces thereof.

For example, Japanese Patent No. JP3303854B2 discloses an automotive alternator which has a stator coil formed by welding a plurality of substantially U-shaped conductor segments to one another. More specifically, each of end portions of the conductor segments has a cut (or notch) formed therein. Each corresponding pair of the end portions of the conductor segments are arranged to have parts thereof where no cut is formed adjoin each other, and then welded at end surfaces thereof. Consequently, with the cuts formed in the end portions of the conductor segments, it is possible to weld each corresponding pair of the end portions of the conductor segments with a reduced heat input to the pair of the end portions during the welding.

On the other hand, however, due to the cuts, it may become easy for the molten metal mixture to sag outside the pair of the end portions of the conductor segments during the welding. Consequently, it may become difficult for the molten metal mixture to form a uniform weld bead shape. As a result, the strength of a weld formed between the pair of the end portions of the conductor segments may become uneven and thus local stress concentration may occur in the weld.

SUMMARY

According to exemplary embodiments, there is provided a rotating electric machine which includes a pair of electric conductors for forming a coil and a weld. Each of the electric conductors has an end portion with an end surface. The weld is formed between the end portions of the electric conductors at the end surfaces of the end portions. Moreover, the end portions of the electric conductors are arranged so that parts of the end portions of the electric conductors adjoin each other. At least one of the end portions of the electric conductors has at least one slit formed therein to divide the end surface of the end portion into a plurality of sections. The weld is formed to cover, at least, the adjoining parts of the end portions of the electric conductors and the at least one slit.

According to the exemplary embodiments, there is also provided a method of manufacturing a rotating electric machine. The method includes the steps of: (1) preparing a pair of electric conductors for forming a coil of the rotating electric machine, each of the electric conductors having an end portion with an end surface; (2) forming at least one slit in at least one of the end portions of the electric conductors to divide the end surface of the end portion into a plurality of sections; (3) arranging the end portions of the electric conductors so that parts of the end portions of the electric conductors adjoin each other; and (4) welding the end portions of the electric conductors at the end surfaces thereof to form a weld that covers, at least, the adjoining parts of the end portions and the at least one slit.

As above, according to the exemplary embodiments, at least one of the end portions of the electric conductors has at least one slit formed therein. Since parts of the end portion divided by the at least one slit have a lower heat capacity than the end portion before the formation of the at least one slit therein, it is possible to weld the end portions of the electric conductors with a reduced heat input to the end portions during the welding. Moreover, with growth of the molten metal mixture during the welding, the molten metal mixture flows into the at least one slit, thereby being held by the parts of the end portion divided by the at least one slit. Consequently, it is possible to prevent the molten metal mixture from sagging outside the end portions of the electric conductors. As a result, it is possible to ensure a uniform weld bead shape of the molten metal mixture, thereby ensuring high strength of the weld that is obtained upon solidification of the molten metal mixture.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
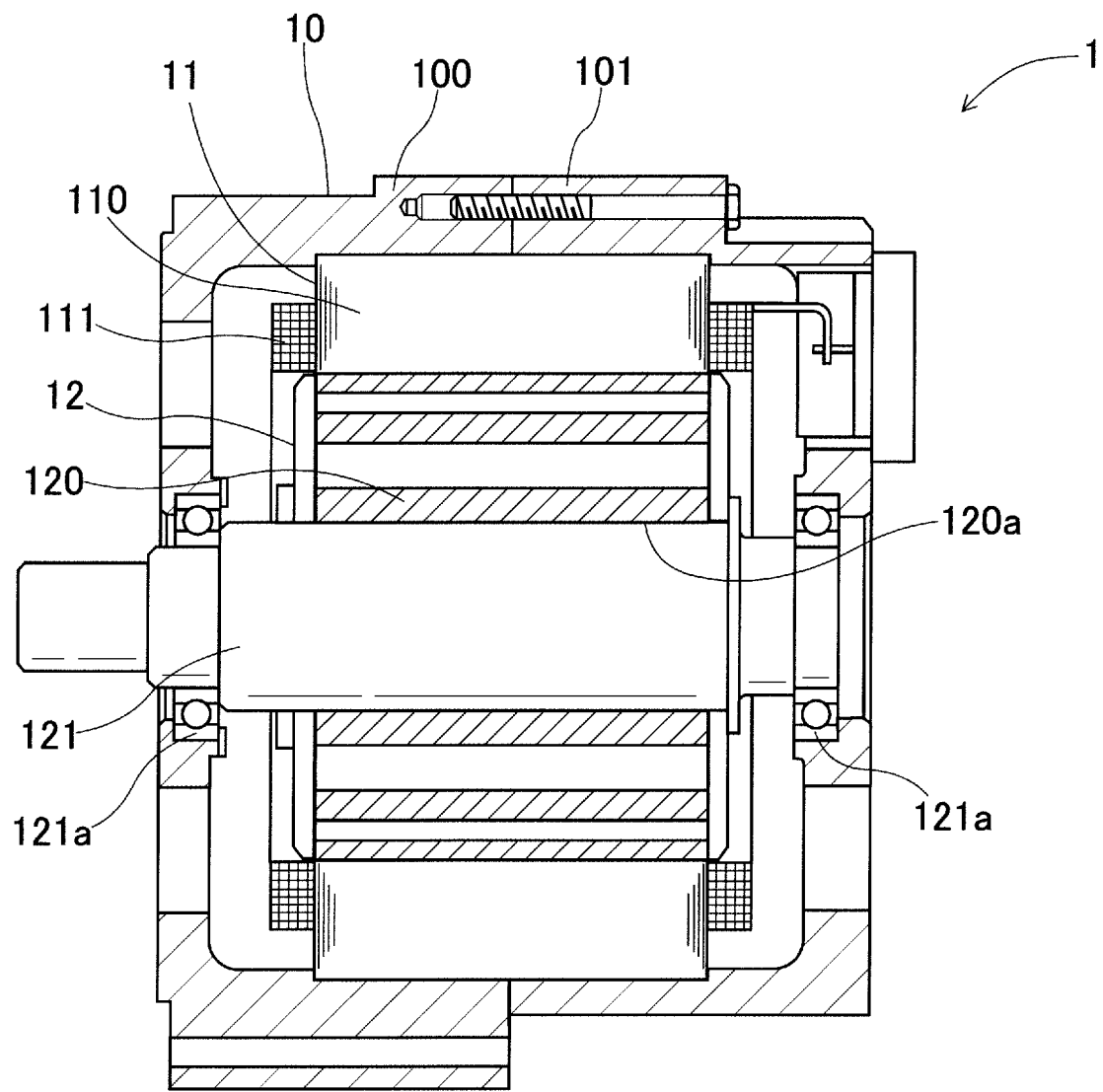
FIG. 1 is a partially cross-sectional view, taken along an axial direction, of a rotating electric machine according to a first embodiment.

Exemplary embodiments and their modifications will be described hereinafter with reference to FIGS. 1-40. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine 1 according to a first embodiment.

In the present embodiment, the rotating electric machine 1 is configured as a motor-generator for use in a motor vehicle. Specifically, upon being supplied with electric power from a battery (not shown) of the vehicle, the rotating electric machine 1 functions as an electric motor to generate torque (or driving force) for driving the vehicle. Otherwise, upon being supplied with torque from an engine (not shown) of the vehicle, the rotating electric machine 1 functions as an electric generator to generate electric power for charging the battery.

As shown in FIG. 1, the rotating electric machine 1 includes a housing 10, a stator 11 and a rotor 12.

The housing 10 receives both the stator 11 and the rotor 12 therein and rotatably supports the rotor 12. The housing 10 is comprised of a pair of cup-shaped housing pieces 100 and 101 which are jointed together at the open ends thereof.

The stator 11 is fixed in the housing 10 so as to surround the radially outer periphery of the rotor 12. The stator 11 constitutes part of a magnetic circuit formed in the rotating electric machine 1. When supplied with electric current, the stator 11 generates magnetic flux. Otherwise, when magnetic flux through the stator 11 is generated by the rotor 12, the stator 11 generates alternating current.

Figure 2:
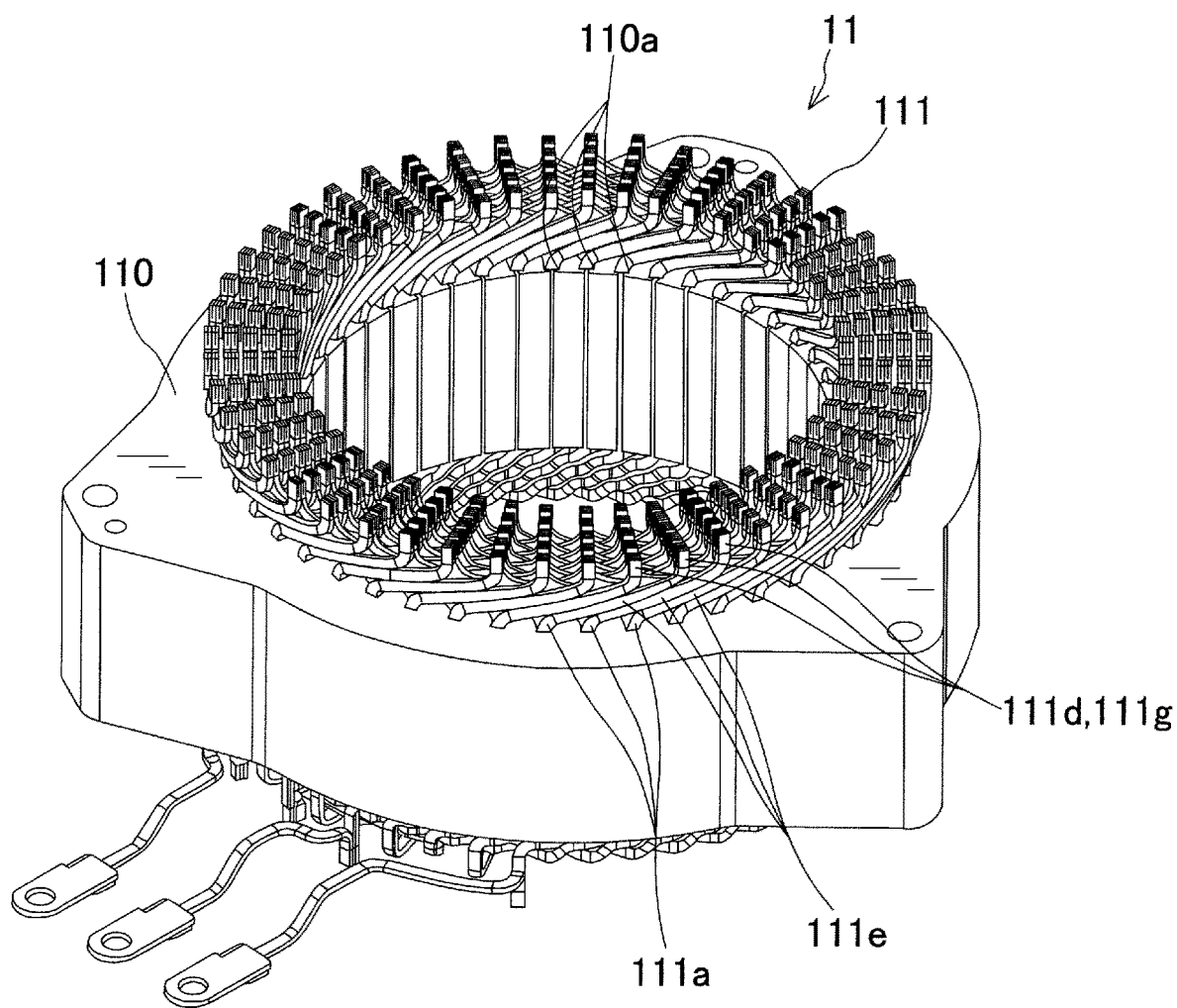
FIG. 2 is a perspective view of a stator of the rotating electric machine, the stator being in a state where end portions of insulated conductor segments have not been welded to form a stator coil of the stator.

As shown in FIGS. 1 and 2, the stator 11 includes an annular (or hollow cylindrical) stator core 110 and a stator coil 111 mounted on the stator core 110.

The stator core 110 is fixed to the inner circumferential surfaces of the housing pieces 100 and 101. The stator core 110 holds the stator coil 111. Moreover, the stator core 110 is made of a magnetic material and constitutes part of the magnetic circuit formed in the rotating electric machine 1. In the stator core 110, there are formed a plurality of slots 110a that each axially penetrate the stator core 110 and are circumferentially spaced from one another at equal intervals. Each of the slots 110a has a substantially rectangular cross section perpendicular to the axial direction of the stator core 110.

As shown in FIGS. 2-5, the stator coil 111 includes a plurality of insulated conductor segments 111a that are welded to one another, a plurality of welds 111b each of which is formed between one corresponding pair of end portions of the insulated conductor segments 111a, and a plurality of weld-insulating members 111c each of which is provided to cover the surface of one of the welds 111b and the corresponding pair of the end portions of the insulated conductor segments 111a joined by the weld 111b.

Figure 6:
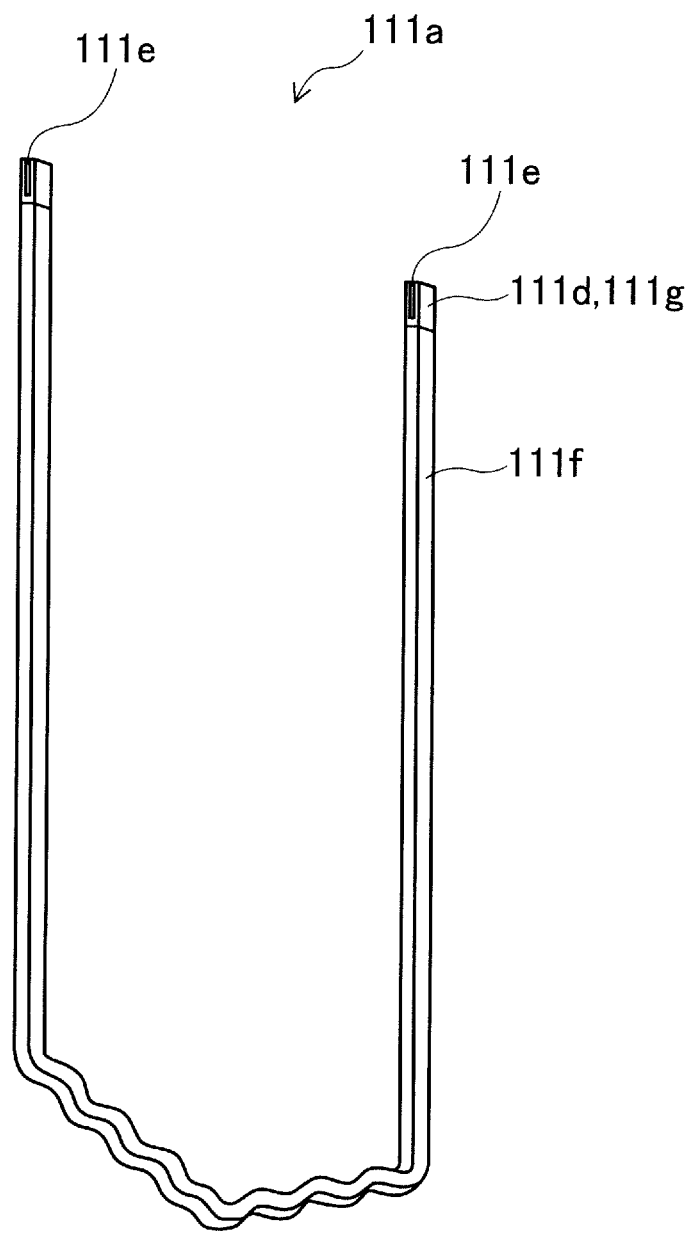
FIG. 6 is a perspective view of one of the insulated conductor segments.
Figure 7:
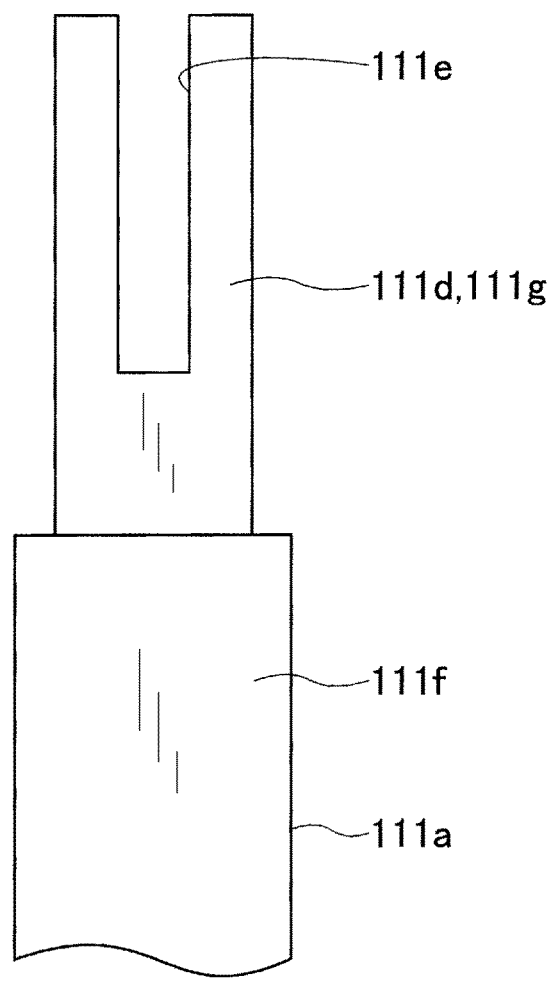
FIG. 7 is a front view of an end portion of one of the insulated conductor segments.
Figure 8:
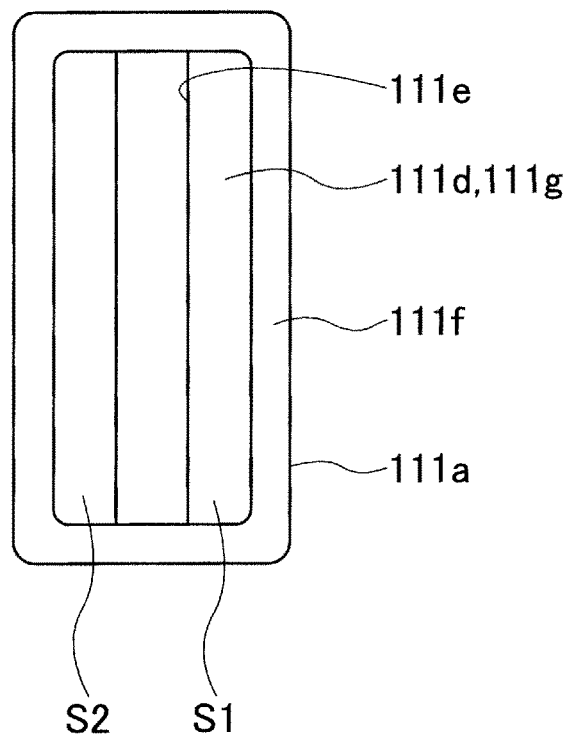
FIG. 8 is a top view of the end portion of the insulated conductor segment shown in FIG. 7.

In the present embodiment, as shown in FIG. 6, each of the insulated conductor segments 111a is substantially U-shaped. Moreover, as shown in FIGS. 6-8, each of the insulated conductor segments 111a includes an electric conductor 111d, a pair of slits 111e and a conductor-insulating member 111f.

The electric conductor 111d is obtained by cutting an electric conductor wire 111g, which is made of an electrically conductive metal (e.g., copper) and has a substantially rectangular cross-sectional shape, into a predetermined length and shaping it into a substantially U-shape. Consequently, the electric conductor 111d has a pair of end surfaces that are opposite to each other.

Each of the slits 111e is formed, in one of a pair of end portions of the substantially U-shaped electric conductor 111d, to divide one of the end surfaces of the electric conductor 111d into two sections. As shown in FIG. 8, each of the slits 111e is formed to have its lengthwise direction parallel to the longer sides of the substantially rectangular end surface of the electric conductor 111d. Moreover, each of the slits 111e is formed so that the areas S1 and S2 of the two sections of the end surface divided by the slit 111e are equal to each other. In addition, the slits 111e may be formed, for example, by cutting.

The conductor-insulating member 111f is made, for example, of an electrically insulative resin. The conductor-insulating member 111f is provided to cover the entire outer periphery of the electric conductor 111d except for the pair of end portions of the substantially U-shaped electric conductor 111d.

In addition, as shown in FIG. 6, each of the insulated conductor segments 111a has a pair of in-slot portions 111f that are respectively received in two different ones of the slots 110a of the stator core 110.

Figure 3:
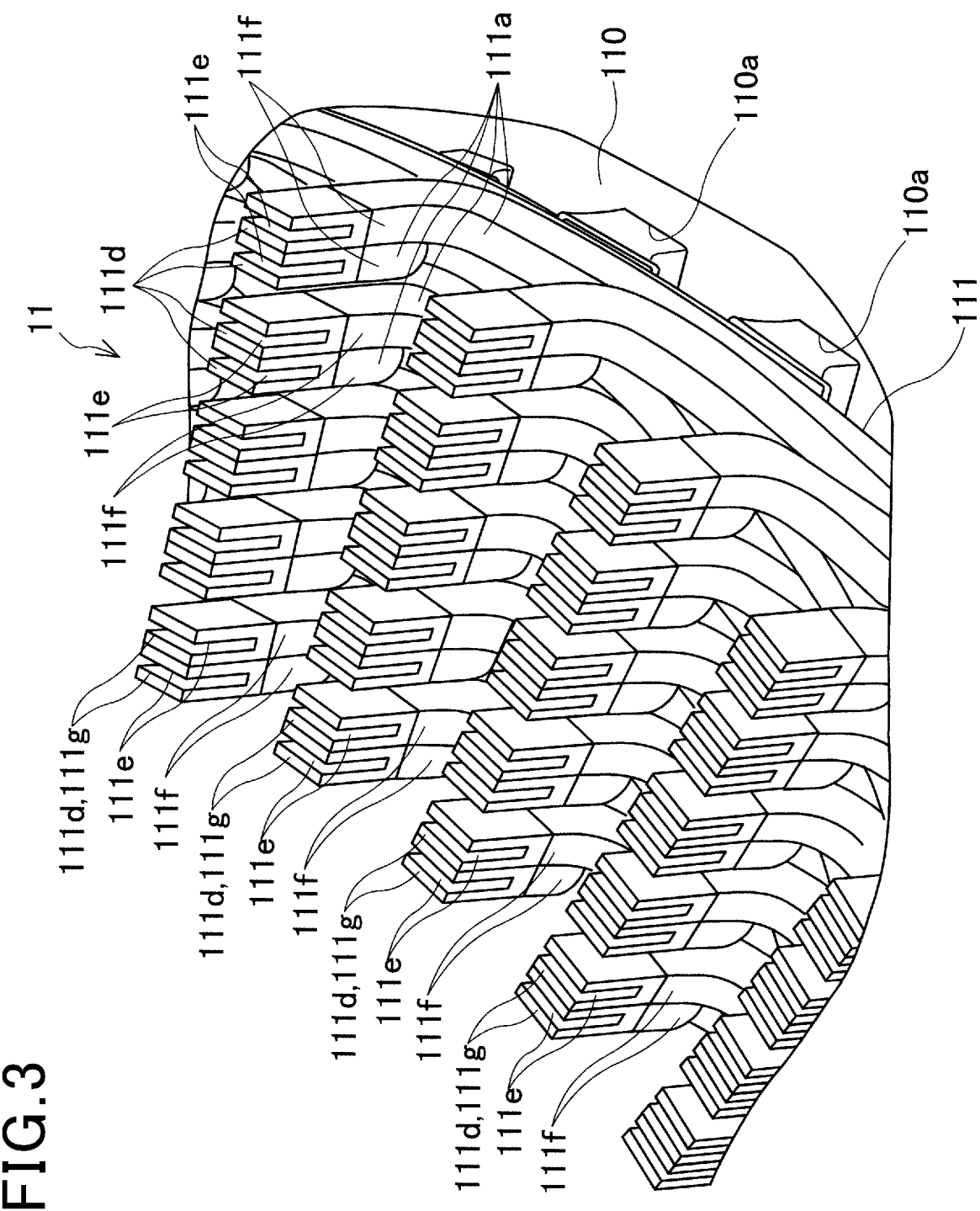
FIG. 3 is a perspective view of part of the stator before the end portions of the insulated conductor segments are welded.
Figure 9:
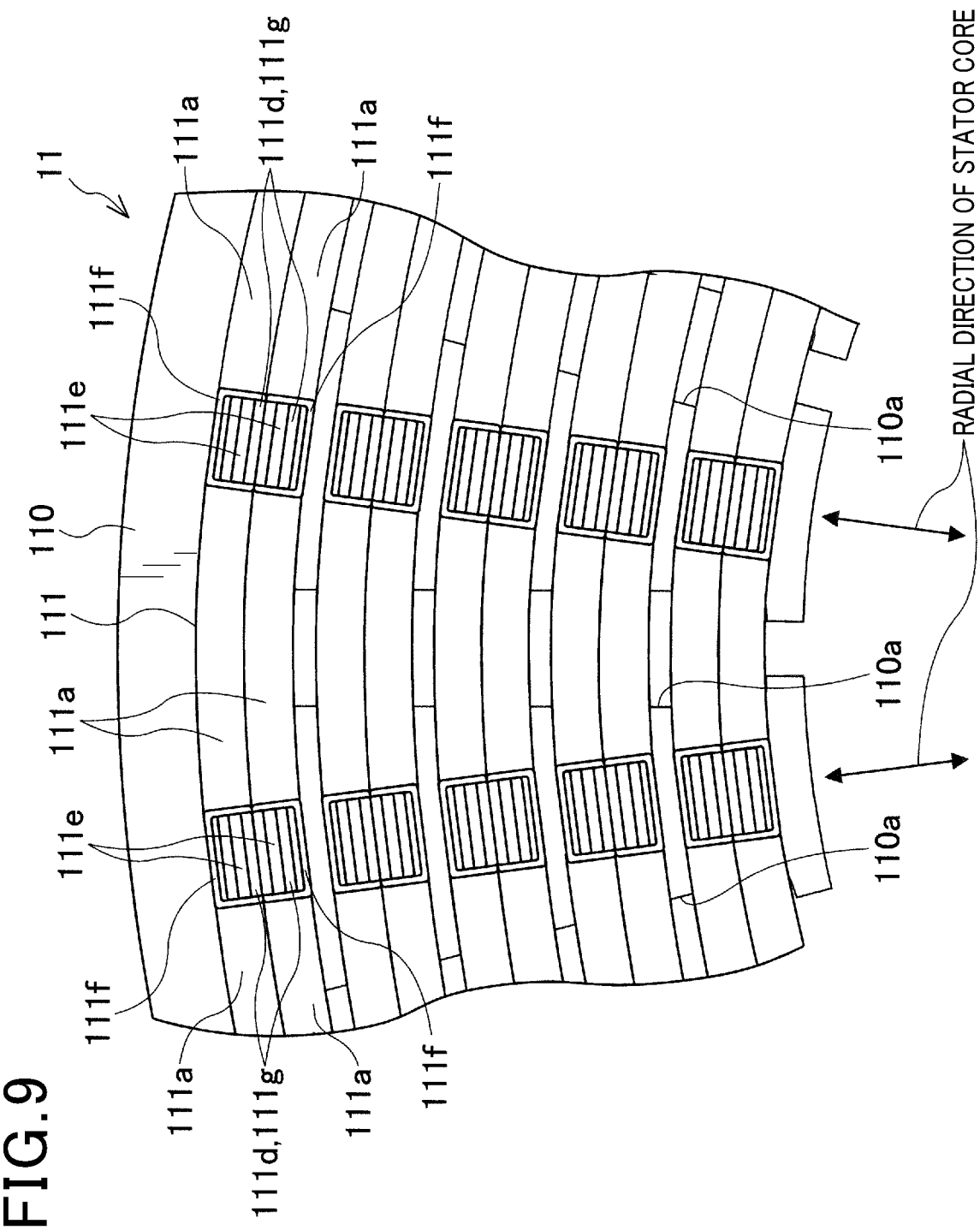
FIG. 9 is an axial end view of part of the stator before the end portions of the insulated conductor segments are welded.
Figure 10:
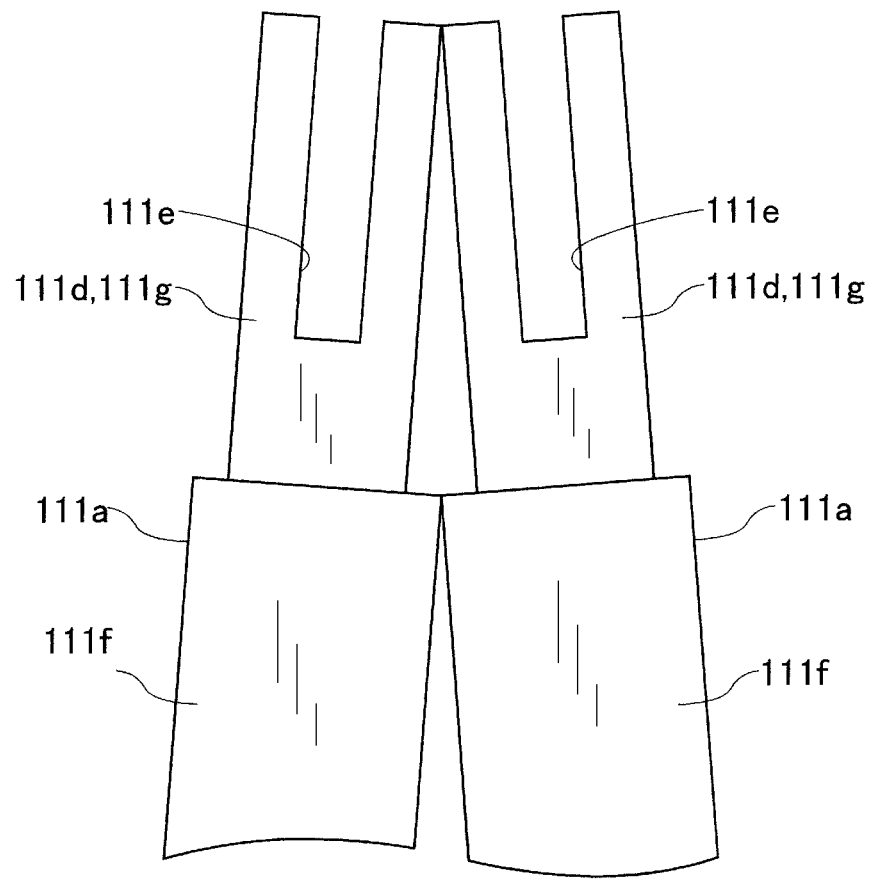
FIG. 10 is a front view of a pair of the insulated conductor segments to be welded to each other.
Figure 11:
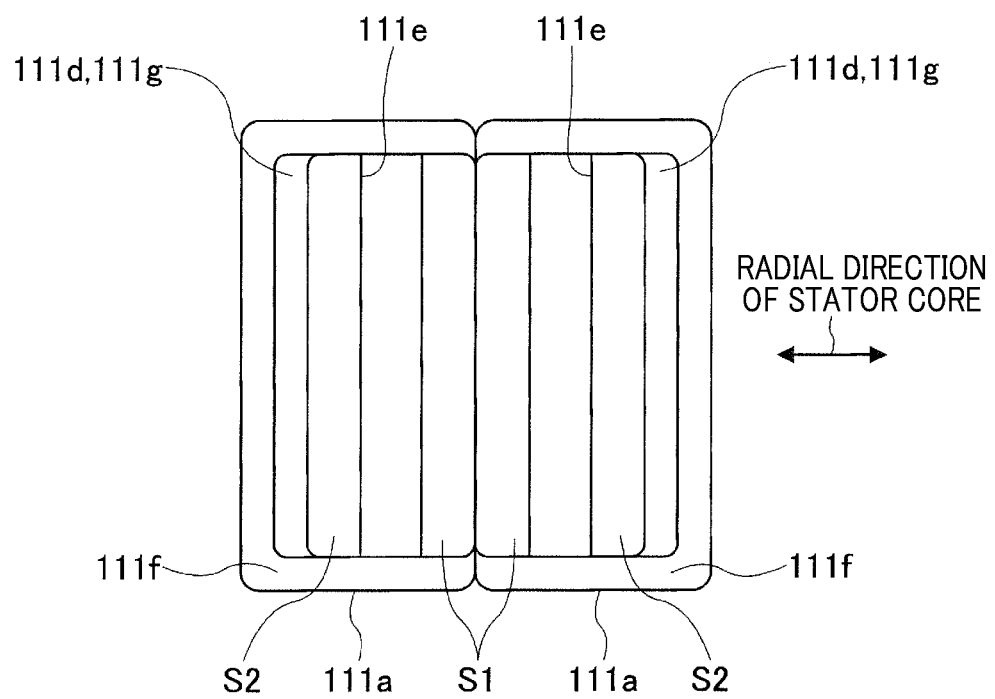
FIG. 11 is a top view of the pair of the insulated conductor segments shown in FIG. 10.

In the present embodiment, in forming the stator coil 111, the insulated conductor segments 111a are inserted into the respective slots 110a of the stator core 110 from a first axial side (i.e., the lower side in FIG. 2) of the stator core 110, thereby having the in-slot portions 111f of the insulated conductor segments 111a received in the respective slots 110a. Further, as shown in FIGS. 2 and 3, distal parts of the insulated conductor segments 111a, which protrude outside the respective slots 110a of the stator core 110 on a second axial side (i.e., the upper side in FIGS. 2 and 3) of the stator core 110, are arranged (or deformed) to together form an annular shape on the second axial side of the stator core 110. Moreover, as shown in FIG. 9, the end portions of the electric conductors 111d are arranged on the second axial side of the stator core 110 so that when viewed along the axial direction of the stator core 110 (or along the direction perpendicular to the end surfaces of the end portions), the lengthwise direction of each of the slits 111e formed in the end portions of the electric conductors 111d is perpendicular to a radial direction of the stator core 110. Furthermore, as shown in FIGS. 9-11, each pair of the end portions of the electric conductors 111d to be welded together are arranged so that: parts of the pair of the end portions of the electric conductors 111d adjoin each other in a radial direction of the stator core 110; and the two slits 111e formed respectively in the pair of the end portions of the electric conductors 111d extend parallel to each other. Then, the pair of the end portions of the electric conductors 111d are welded at the end surfaces thereof to form one of the welds 111b which covers the adjoining parts and the slits 111e of the pair of the end portions.

Figure 12:
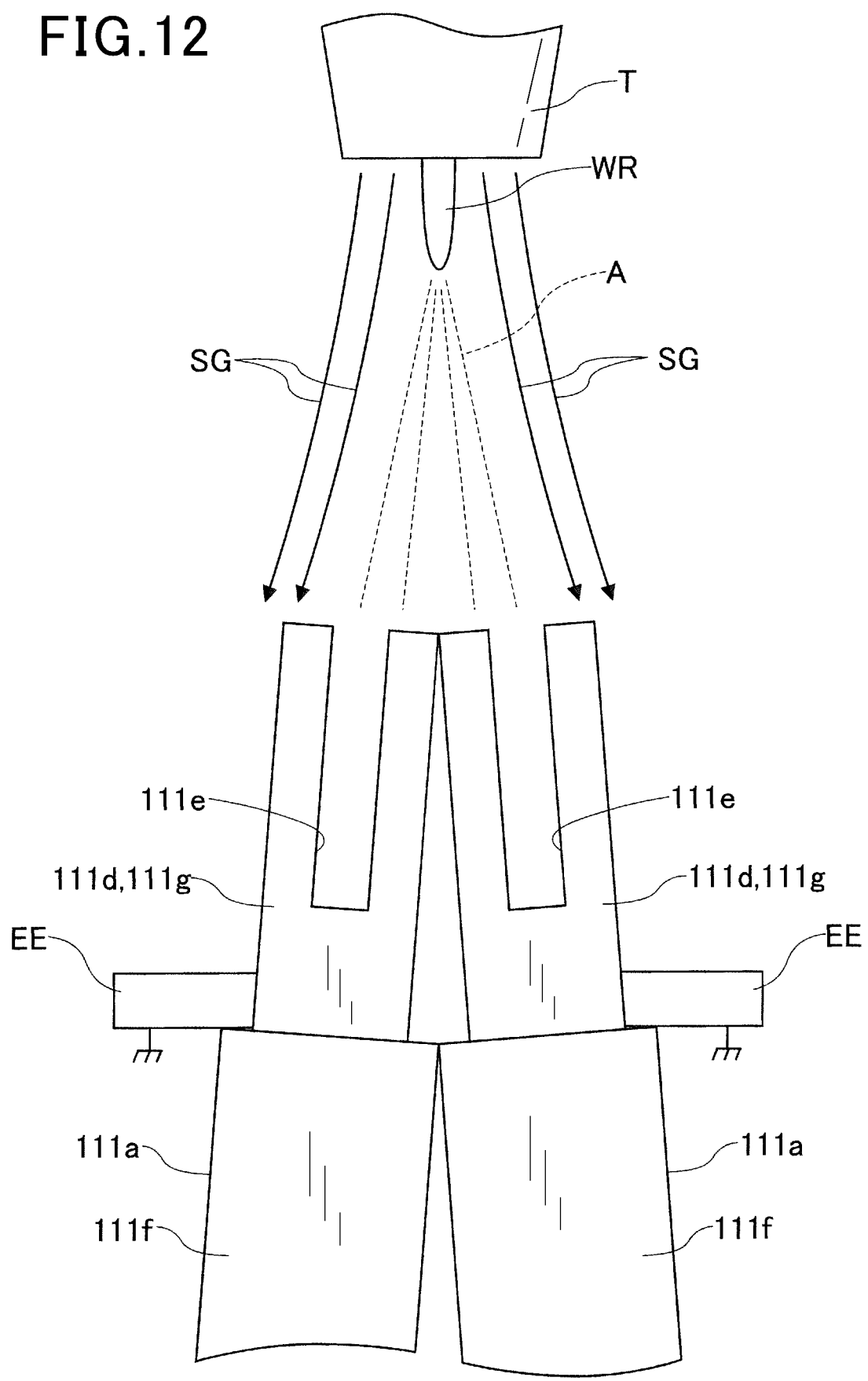
FIG. 12 is a first schematic view illustrating a process of welding the pair of the insulated conductor segments shown in FIGS. 10 and 11.

Specifically, as shown in FIG. 12, in the welding process, the pair of the end portions of the electric conductors 111d are respectively grounded by a pair of earth electrodes EE. To prevent the mixing-in of nitrogen and/or oxygen, a shielding gas SG is discharged from a distal end (i.e., the lower end in FIG. 12) of a torch T to the pair of the end portions of the electric conductors 111d. Upon application of a voltage, which takes the earth electrodes EE as a reference, to a welding rod WR, an electric arc A is generated between a distal end portion (i.e., a lower end portion in FIG. 12) of the welding rod WR and the pair of the end portions of the electric conductors 111d.

Figure 13:
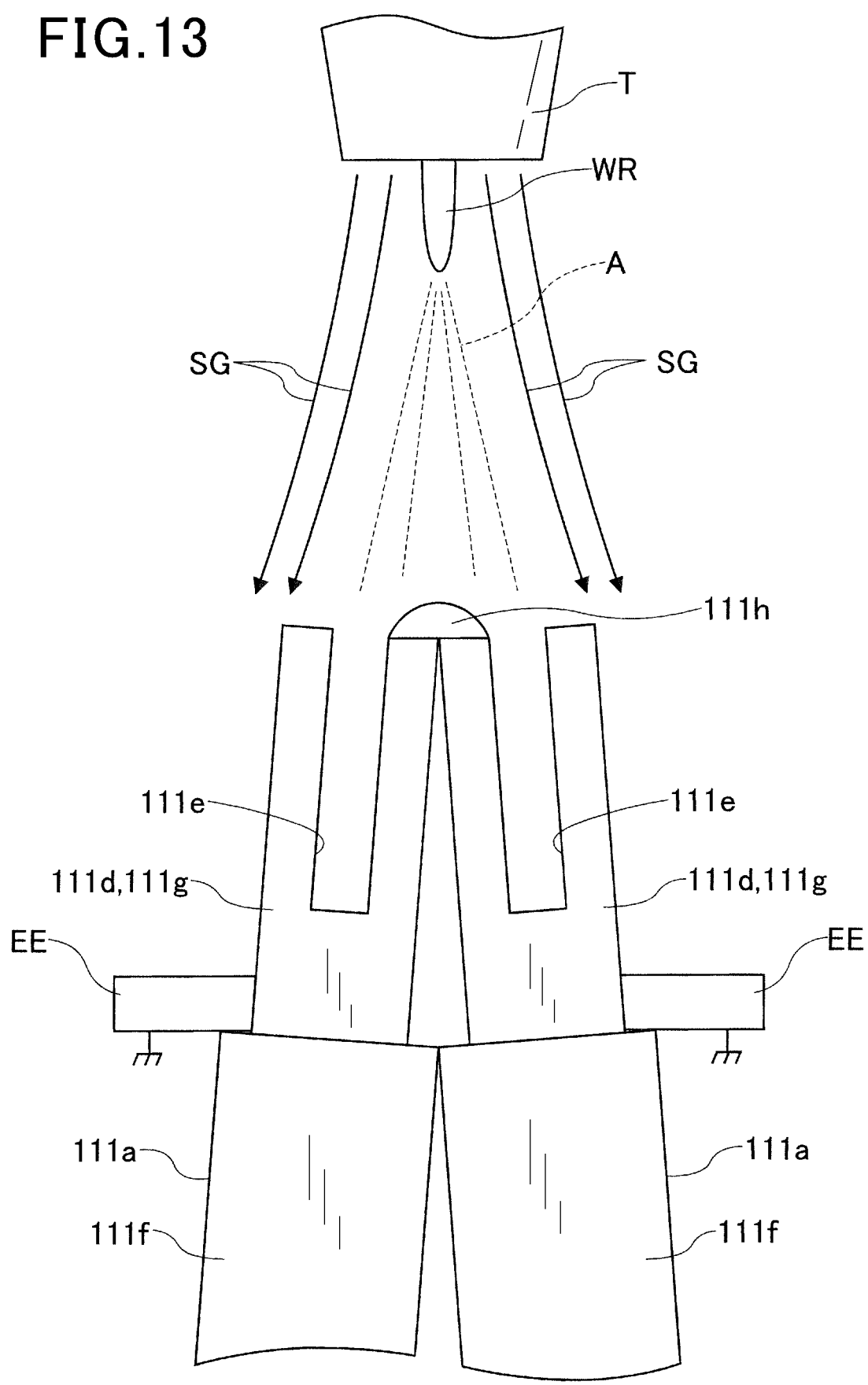
FIG. 13 is a second schematic view illustrating the welding process.

Upon generation of the electric arc A, as shown in FIG. 13, of parts of the pair of the end portions of the electric conductors 111d divided by the respective slits 111e, the central parts (or inner parts) are first melted at the distal ends thereof, forming a molten metal mixture 111h. Here, the parts of the end portions of the electric conductors 111d divided by the respective slits 111e have a lower heat capacity than the end portions of the electric conductors 111d before the formation of the respective slits 111e therein. Consequently, it becomes possible to melt the central parts with a reduced heat input.

Figure 14:
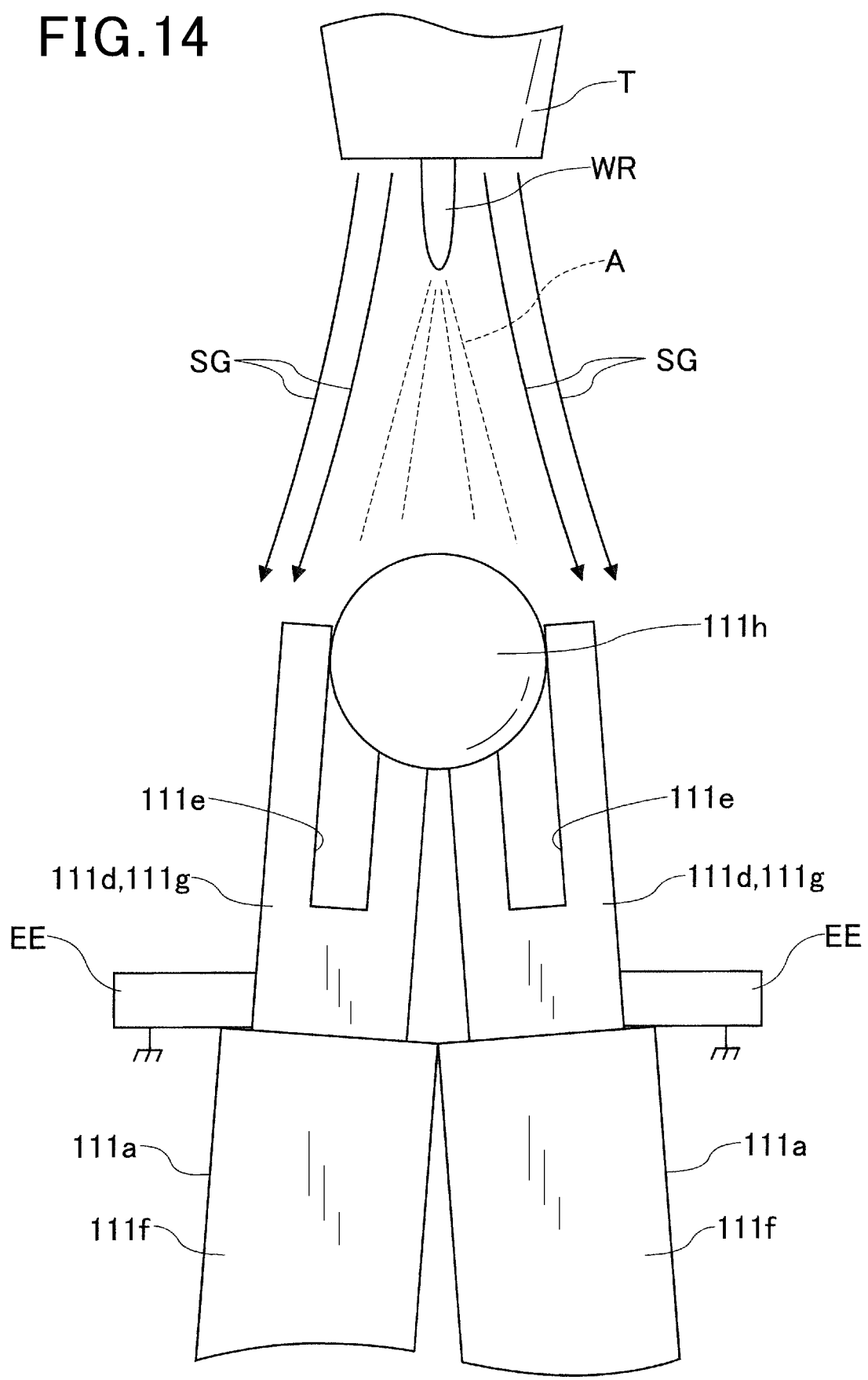
FIG. 14 is a third schematic view illustrating the welding process.

Further, as shown in FIG. 14, the molten metal mixture 111h grows with time to become large. During the growth, the molten metal mixture 111h flows into each of the slits 111e formed in the pair of the end portions of the electric conductors 111d, thereby being held by the parts of the end portion divided by the slit 111e from both sides of the slit 111e. Consequently, it becomes possible to prevent the molten metal mixture 111h from sagging outside the pair of the end portions of the electric conductors 111d.

Figure 15:
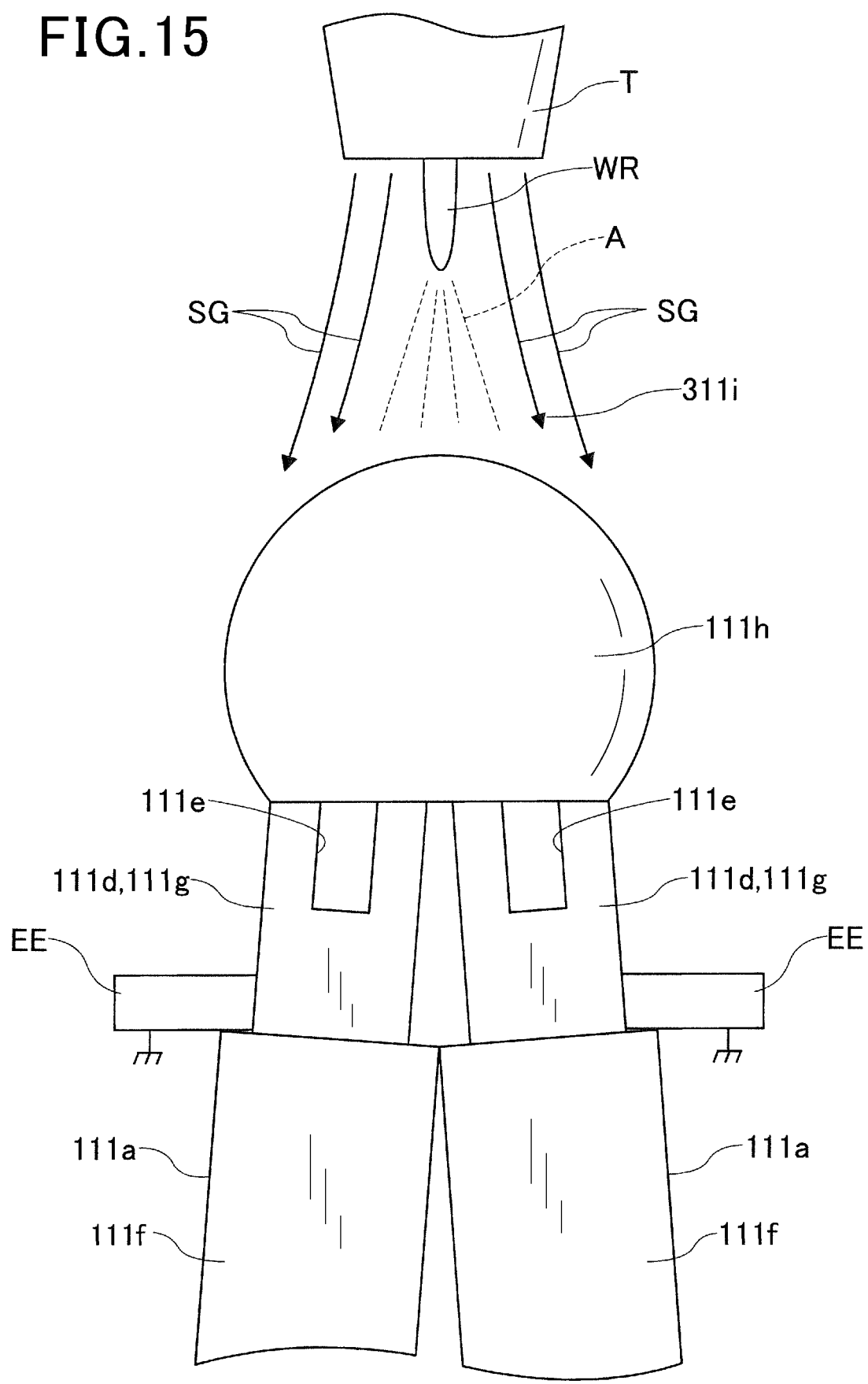
FIG. 15 is a fourth schematic view illustrating the welding process.

As a result, as shown in FIG. 15, at the distal ends of the pair of the end portions of the electric conductors 111d, there is formed the molten metal mixture 111h which has a uniform weld bead shape without sagging outside.

Figure 16:
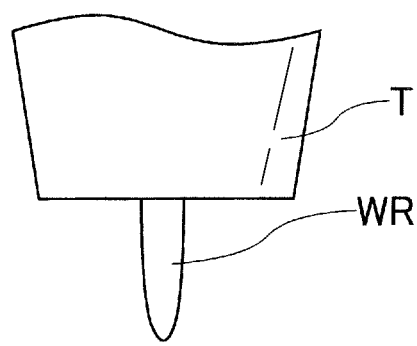
FIG. 16 is a fifth schematic view illustrating the welding process.
Figure 16:
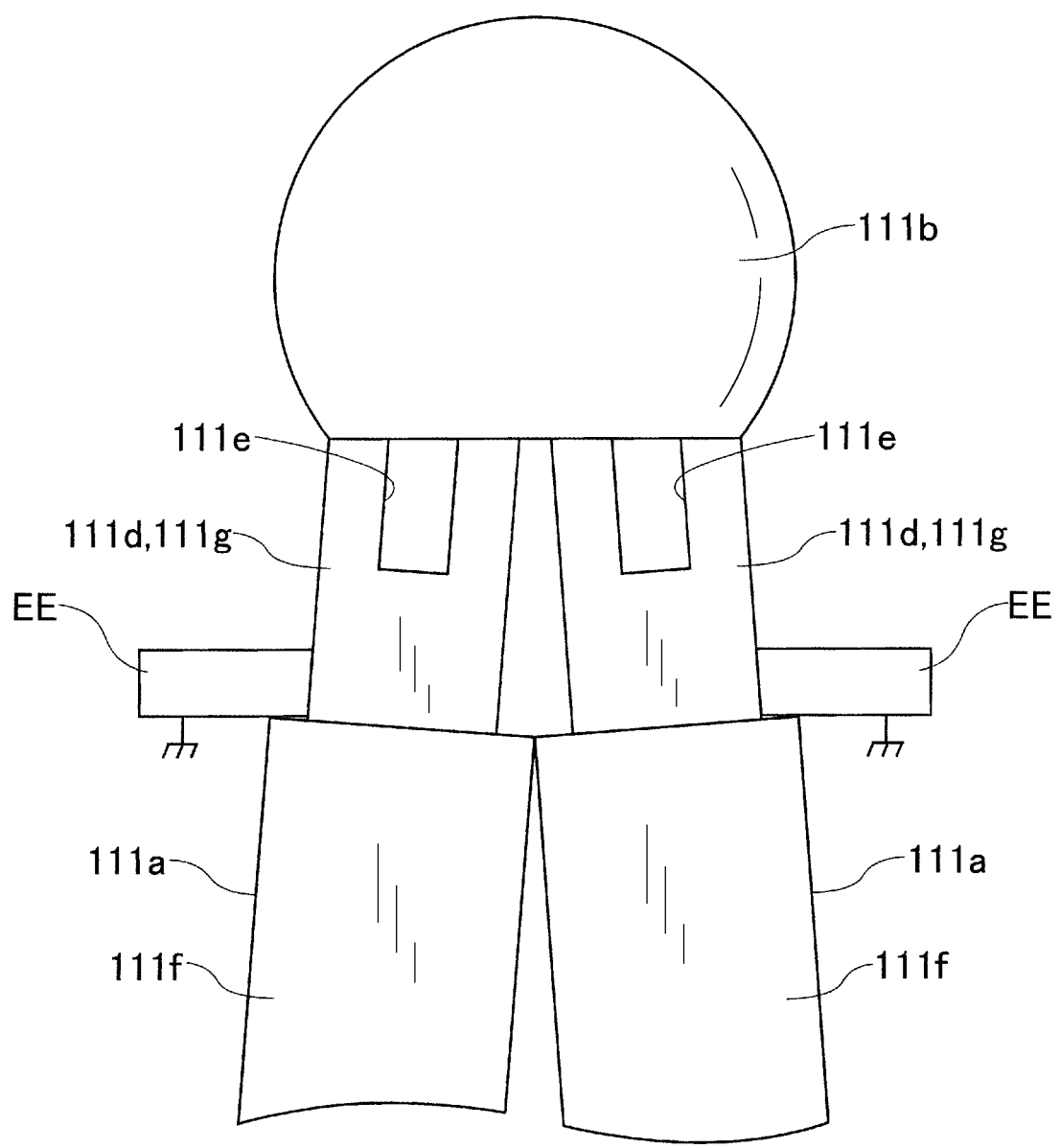

Furthermore, as shown in FIG. 16, upon being cooled, the molten metal mixture 111h is solidified to form one of the welds 111b which also has a uniform weld bead shape without sagging outside.

In addition, the welding process is performed along the lengthwise direction of the slits 111e over the entire circumferential length of the pair of the end portions of the electric conductors 111d either with the stator core 110 being rotated in the circumferential direction or with the torch T being moved in the circumferential direction of the stator core 110.

Figure 4:
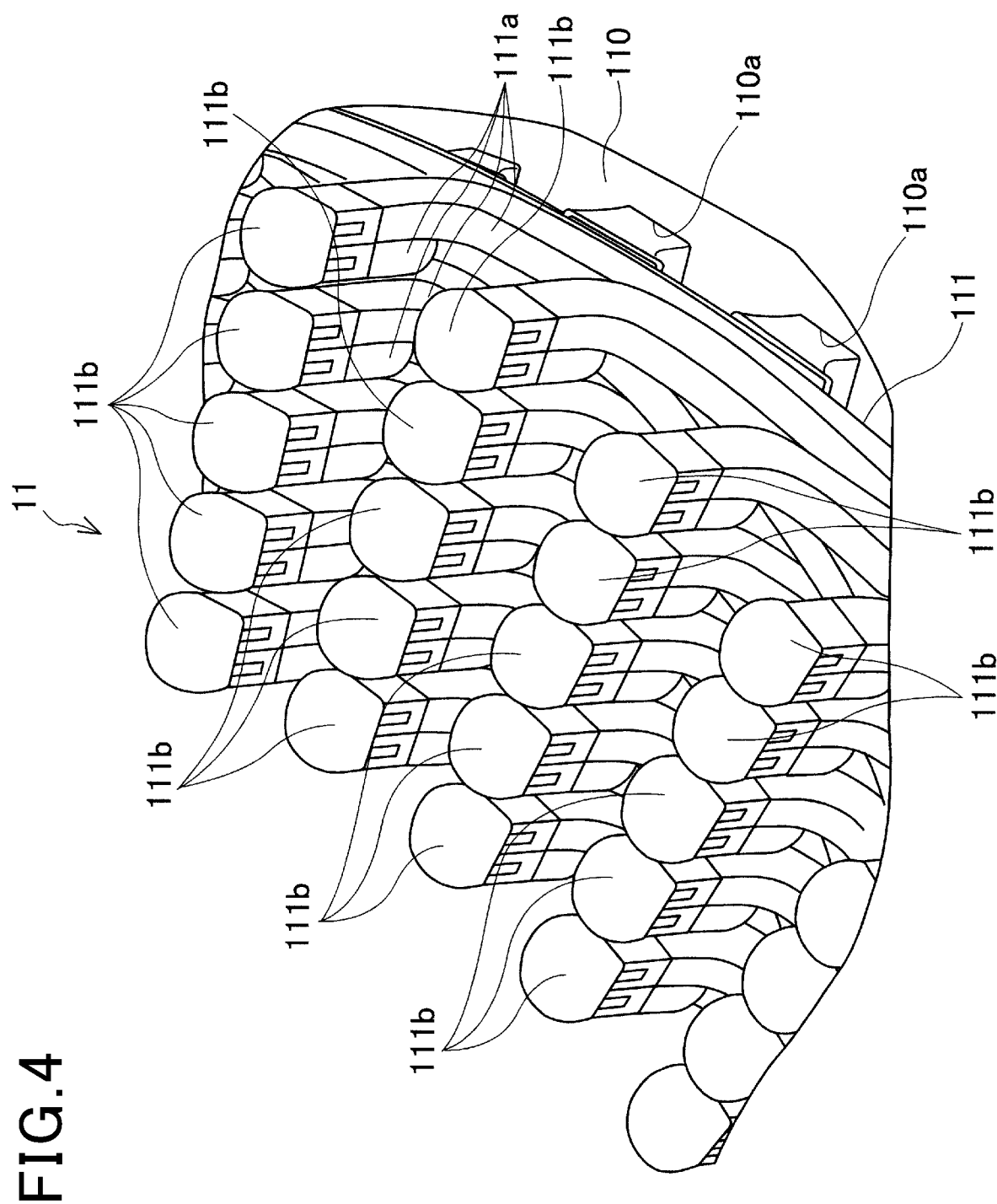
FIG. 4 is a perspective view of part of the stator after the end portions of the insulated conductor segments are welded.
Figure 17:
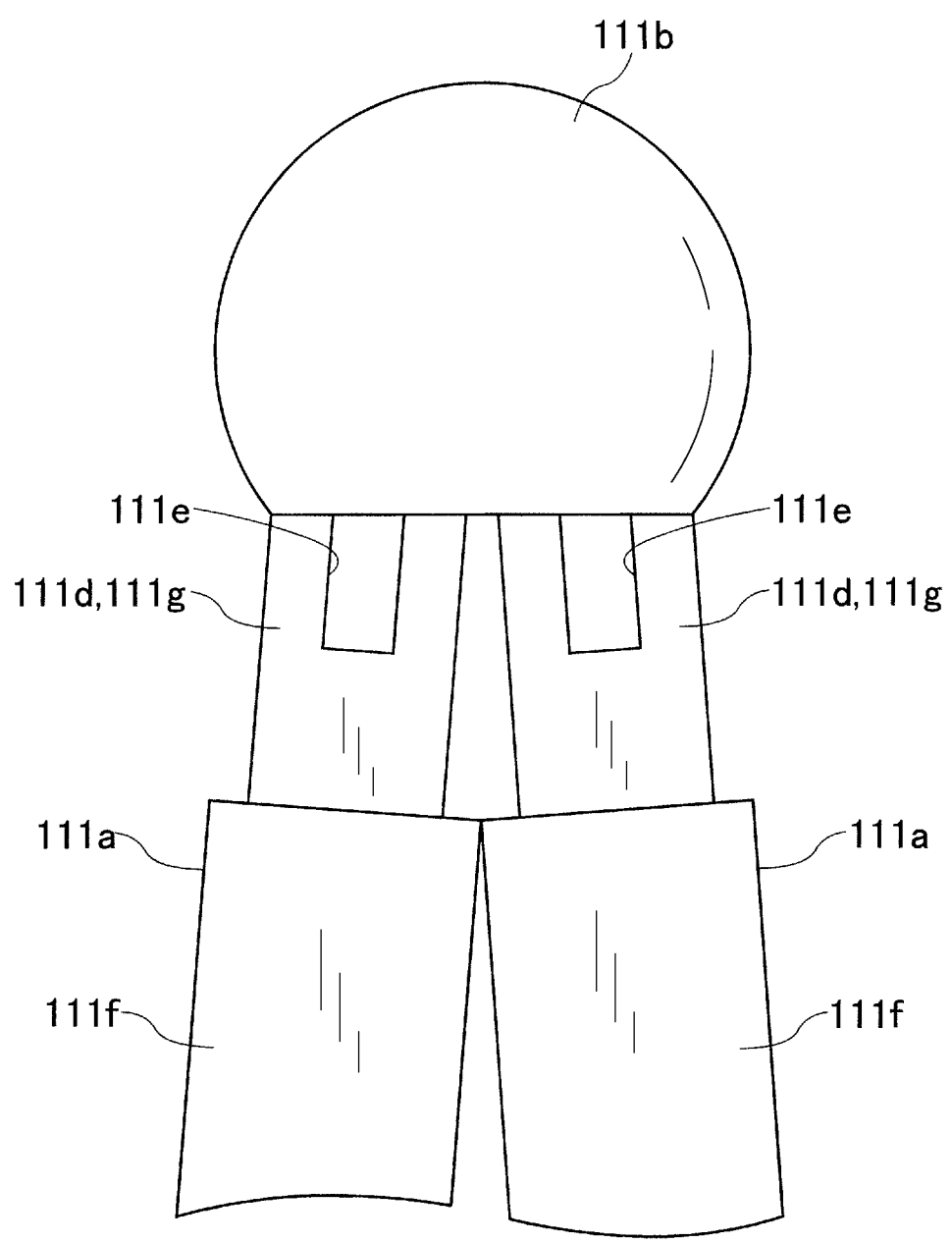
FIG. 17 is a front view of the pair of the insulated conductor segments welded to each other.
Figure 18:
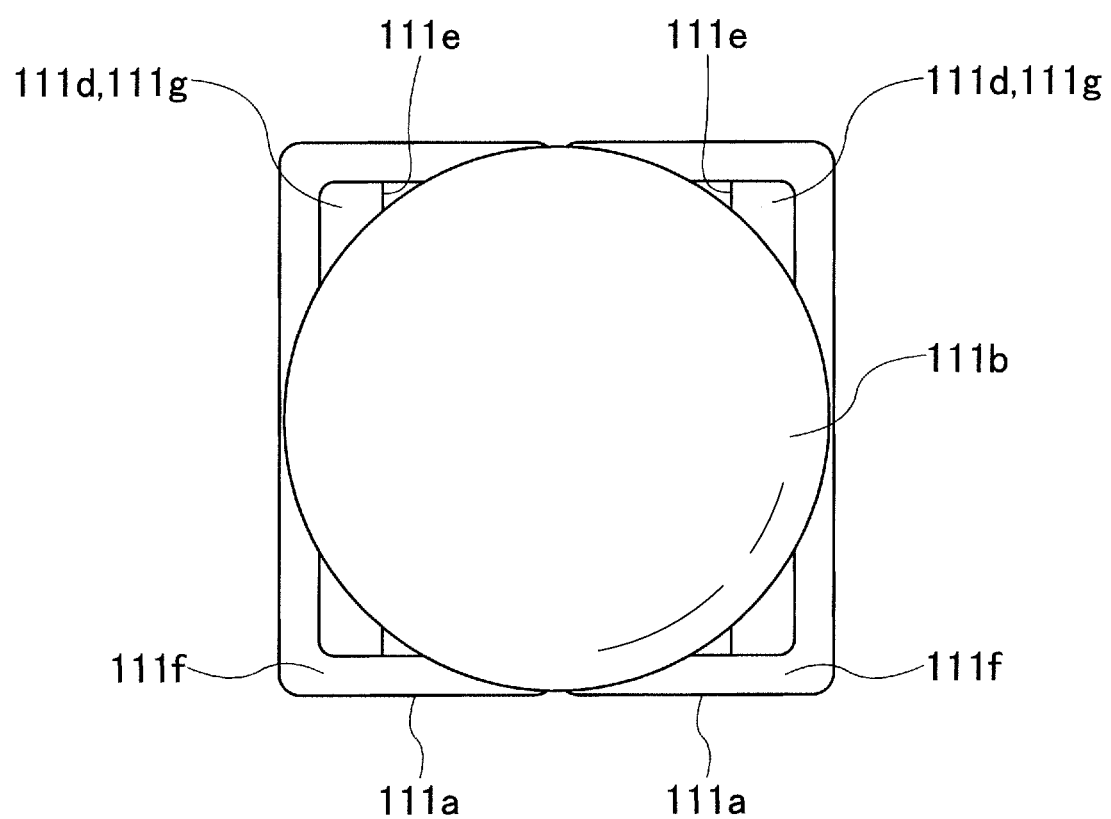
FIG. 18 is a top view of the pair of the insulated conductor segments welded to each other.

In the above-described manner, each corresponding pair of the end portions of the electric conductors 111d of all the insulated conductor segments 111a are welded to form one of the welds 111b therebetween, as shown in FIGS. 4 and 17-18.

Figure 5:
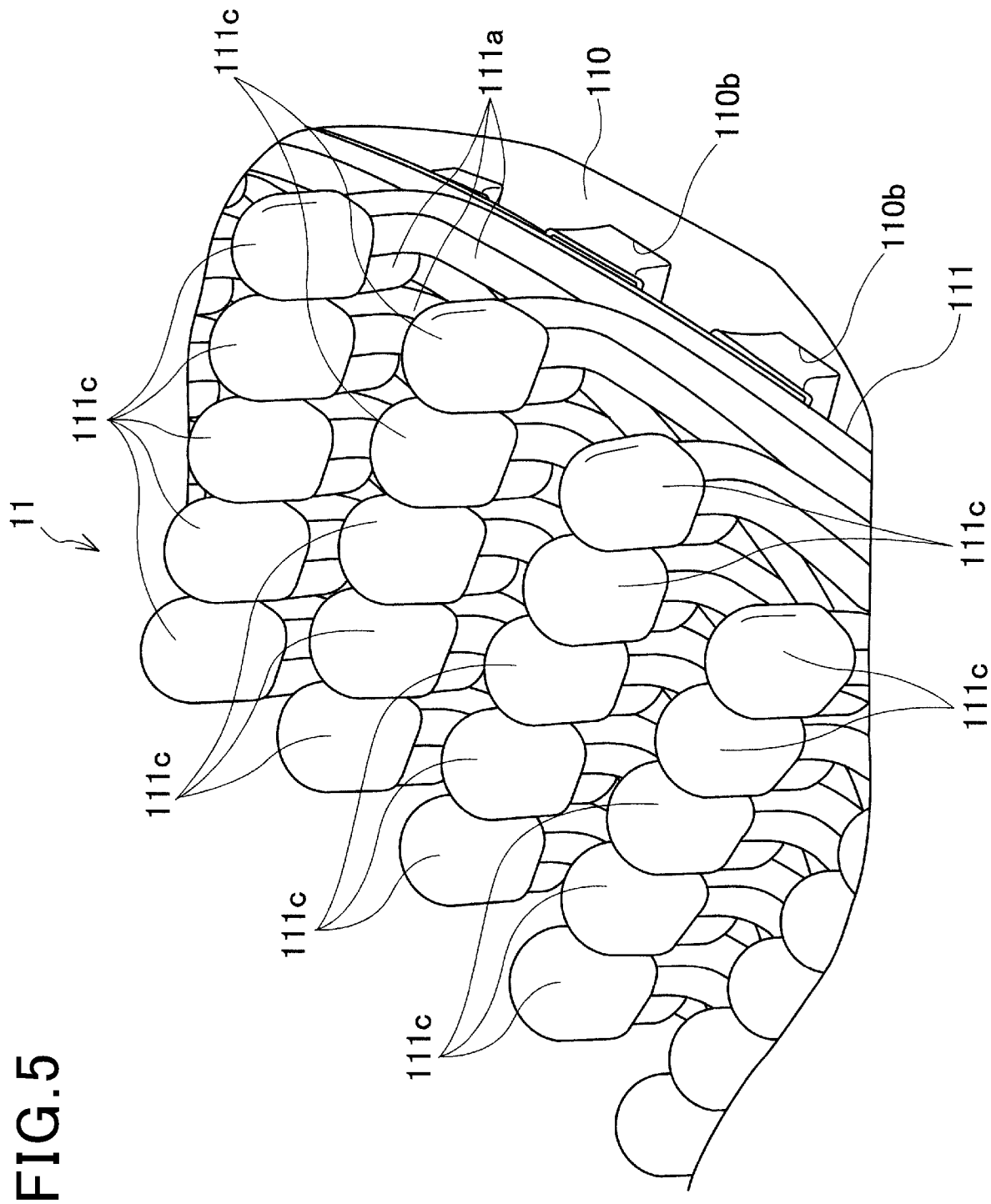
FIG. 5 is a perspective view of part of the stator where weld-insulating members are provided to respectively cover welds formed between the end portions of the insulated conductor segments.
Figure 19:
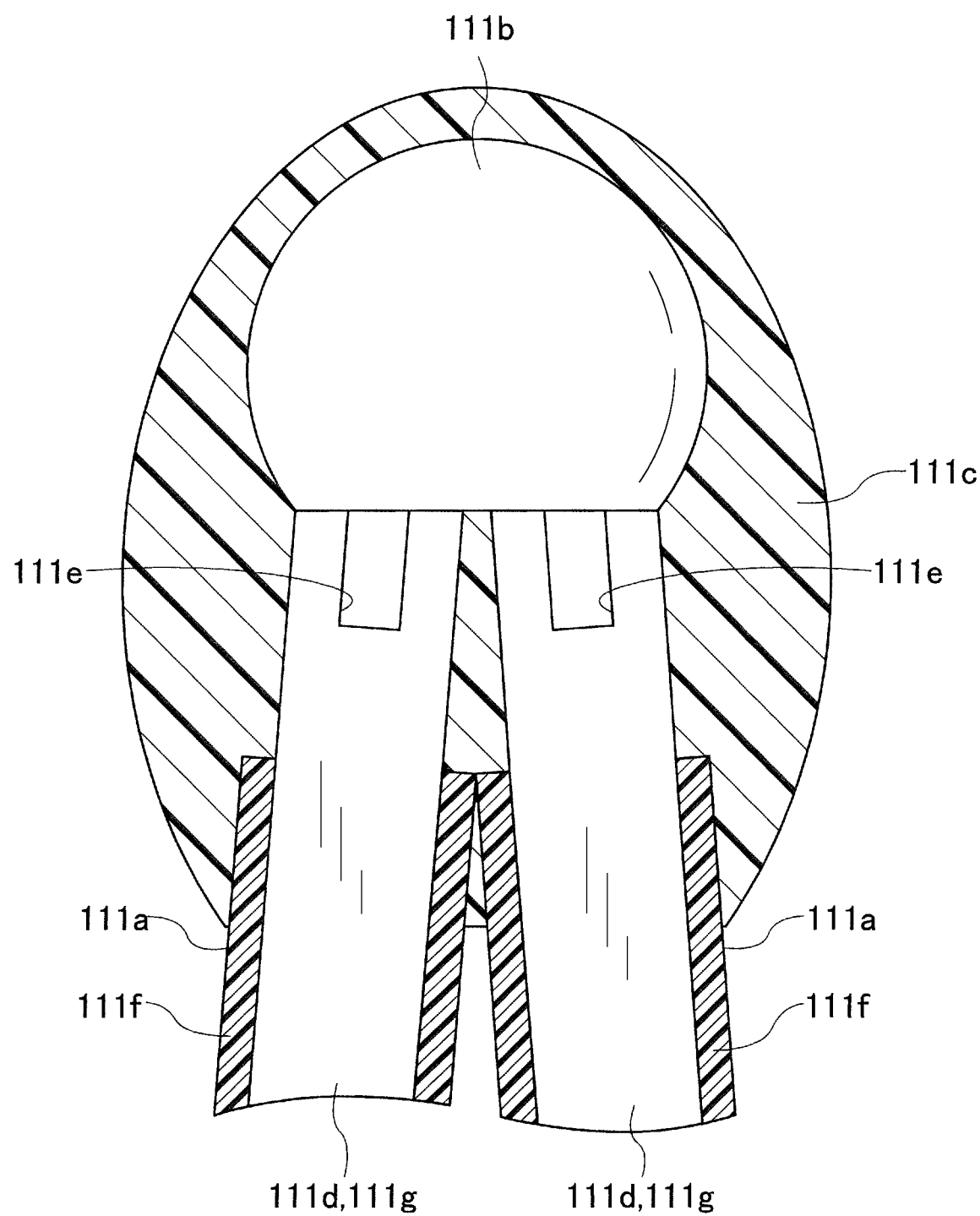
FIG. 19 is a cross-sectional view of the pair of the insulated conductor segments with a weld-insulating member provided to cover the weld formed between the pair of the insulated conductor segments.

Each of the weld-insulating members 111c is made, for example, of an electrically insulative resin. As shown in FIG. 5, each of the weld-insulating members 111c is provided to cover the surface of one of the welds 111b and the corresponding pair of the end portions of the electric conductors 111d of the insulated conductor segments 111a joined by the weld 111b. More particularly, in the present embodiment, as shown in FIG. 19, each of the weld-insulating members 111c is provided to cover the surface of one of the welds 111b and distal end portions of the conductor-insulating members 111f respectively covering the pair of the electric conductors 111d joined by the weld 111b.

Referring back to FIG. 1, the rotor 12 constitutes part of the magnetic circuit formed in the rotating electric machine 1. When magnetic flux through the rotor 12 is generated by the stator 11, the rotor 12 generates torque. Otherwise, when rotated by torque supplied by the engine of the vehicle, the rotor 12 generates magnetic flux passing through the stator coil 111, thereby inducing alternating current in the stator coil 111. The rotor 12 includes an annular (or hollow cylindrical) rotor core 120 and a rotating shaft 121.

The rotor core 120 is made of a magnetic material and constitutes part of the magnetic circuit formed in the rotating electric machine 1. At a radially central part of the rotor core 120, there is formed a circular through-hole 120a so as to axially penetrate the rotor core 120. Moreover, on a radially outer periphery of the rotor core 120, there are arranged magnets to form a plurality of magnetic poles. The rotor core 120 is located radially inside the stator core 110, so that the magnets arranged on the radially outer periphery of the rotor core 120 face the radially inner surface of the stator core 110 through a predetermined air gap formed therebetween.

The rotating shaft 121 is made of a metal and has a substantially cylindrical shape. The rotating shaft 121 is fixedly fitted in the through-hole 120a of the rotor core 120 and rotatably supported by the housing 10 via a pair of bearings 121a.

Next, operation of the rotating electric machine 1 according to the present embodiment will be described.

As mentioned previously, in the present embodiment, the rotating electric machine 1 is configured as a motor-generator that selectively operates in either a motor mode or a generator mode.

In the motor mode, electric power is supplied from the battery of the vehicle to the stator coil 111. Consequently, electric current flows in the stator coil 111, generating magnetic flux. The generated magnetic flux passes through the rotor 12, causing the rotor 12 to rotate and generate torque for driving the vehicle.

In the generator mode, the rotor 12 is rotated by torque supplied from the engine of the vehicle, generating magnetic flux. The generated magnetic flux passes through the stator coil 111, inducing alternating current in the stator coil 111. The alternating current is then rectified into direct current, and the obtained direct current is used to charge the battery of the vehicle.

According to the present embodiment, it is possible to achieve the following advantageous effects.

In the present embodiment, the rotating electric machine 1 includes the stator coil 111 that is formed by welding the electric conductors 111d of the insulated conductor segments 111a to one another. Specifically, each of the end portions of the electric conductors 111d has one of the slits 111e formed therein to divide the end surface of the end portion into two sections. In forming the stator coil 111, each pair of the end portions of the electric conductors 111d to be welded together are arranged so that parts of the pair of the end portions of the electric conductors 111d adjoin each other. Then, the pair of the end portions of the electric conductors 111d are welded at the end surfaces thereof to form one of the welds 111b which covers, at least, the adjoining parts and the slits 111e of the pair of the end portions. More particularly, in the present embodiment, the weld 111b covers the entire end surfaces of the pair of the end portions of the electric conductors 111d.

Since the parts of the end portions of the electric conductors 111d divided by the respective slits 111e have a lower heat capacity than the end portions of the electric conductors 111d before the formation of the respective slits 111e therein, it is possible to weld each pair of the end portions of the electric conductors 111d with a reduced heat input to the pair of the end portions during the welding. Moreover, with growth of the molten metal mixture 111h during the welding, the molten metal mixture 111h flows into each of the slits 111e formed in the pair of the end portions of the electric conductors 111d, thereby being held by the parts of the end portion divided by the slit 111e from both sides of the slit 111e. Consequently, it is possible to prevent the molten metal mixture 111h from sagging outside the pair of the end portions of the electric conductors 111d. As a result, it is possible to ensure a uniform weld bead shape of the molten metal mixture 111h, thereby ensuring high strength of the weld 111b that is obtained upon solidification of the molten metal mixture 111h.

In the present embodiment, the rotating electric machine 1 also includes the annular stator core 110 that holds the stator coil 111. In forming the stator coil 111, the electric conductors 111d are arranged so that the end portions of the electric conductors 111d protrude from an axial end face (i.e., the upper end face in FIGS. 2-5) of the stator core 110 and the lengthwise direction of each of the slits 111e formed in the end portions of the electric conductors 111d is perpendicular to a radial direction of the stator core 110 (see FIGS. 3 and 9).

With the above arrangement, it is possible to weld each pair of the end portions of the electric conductors 111d along the lengthwise direction of the slits 111e formed therein while rotating the stator core 110 in the circumferential direction or moving the torch T in the circumferential direction of the stator core 110. Consequently, it is possible to improve the efficiency of the welding process while reliably preventing the molten metal mixture 111h from sagging outside the pair of the end portions of the electric conductors 111d. As a result, it is possible to minimize the manufacturing time of the stator coil 111 while ensuring high strength of the stator coil 111.

Second Embodiment

A rotating electric machine 1 according to a second embodiment has almost the same structure as the rotating electric machine 1 according to the first embodiment. Accordingly, the differences therebetween will be mainly described hereinafter.

In the first embodiment, each of the electric conductors 111d of the insulated conductor segments 111a is constituted of a single electric conductor wire 111g.

Figure 20:
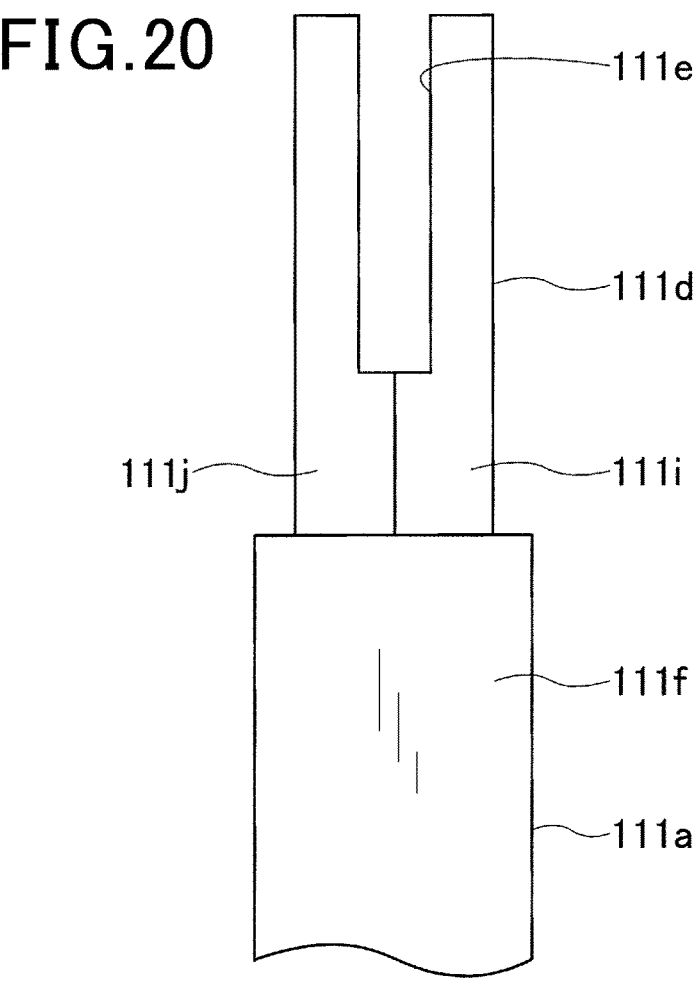
FIG. 20 is a front view of an end portion of one of insulated conductor segments according to a second embodiment.
Figure 21:
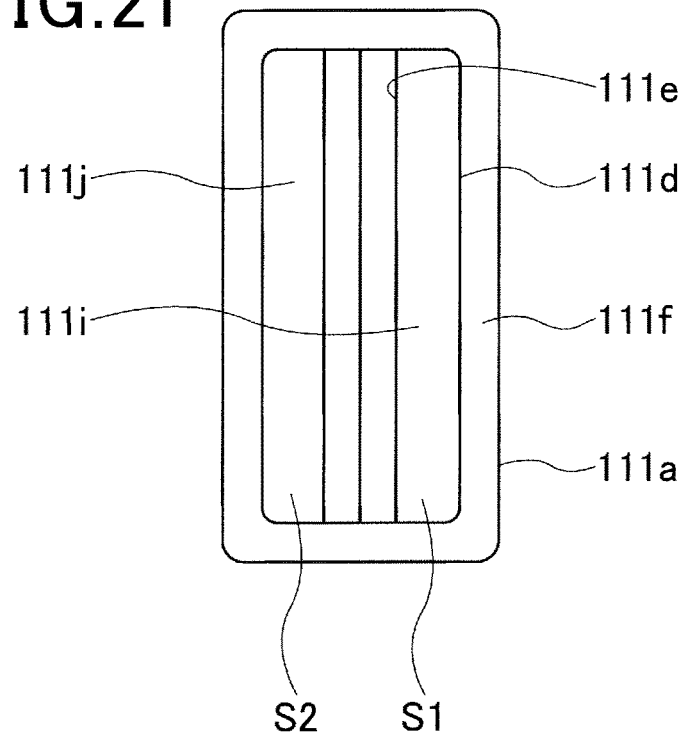
FIG. 21 is a top view of the end portion of the insulated conductor segment shown in FIG. 20.

In comparison, in the present embodiment, as shown in FIGS. 20 and 21, each of the electric conductors 111d of the insulated conductor segments 111a is constituted of a pair of electric conductor wires 111i and 111j arranged to adjoin (or abut) each other. The area of a cross section of the electric conductor wire 111i perpendicular to an axial direction (or longitudinal direction) of the electric conductor wire 111i is equal to the area of a cross section of the electric conductor wire 111j perpendicular to an axial direction of the electric conductor wire 111j.

Moreover, each of the end portions of the electric conductor wires 111i and 111j has a cut formed in a side surface thereof. Each pair of the end portions of the electric conductor wires 111i and 111j are arranged so that the cuts formed in the pair of the end portions are continuous with each other. Consequently, the cuts together constitute one slit 111e that is formed in the end portion of the electric conductor 111d, which is constituted of the pair of the end portions of the electric conductor wires 111i and 111j, to divide the end surface of the end portion of the electric conductor 111d into two equal sections. That is, the area S1 of a first section which is constituted of the end surface of the end portion of the electric conductor wire 111i is equal to the area S2 of a second section which is constituted of the end surface of the end portion of the electric conductor wire 111*j*. In addition, as shown in FIG. 21, the slit 111*e* is formed between the pair of the end portions of the electric conductor wires 111*i* and 111*j* along a lengthwise direction of the substantially rectangular end surface of the end portion of the electric conductor 111*d*.

Figure 22:
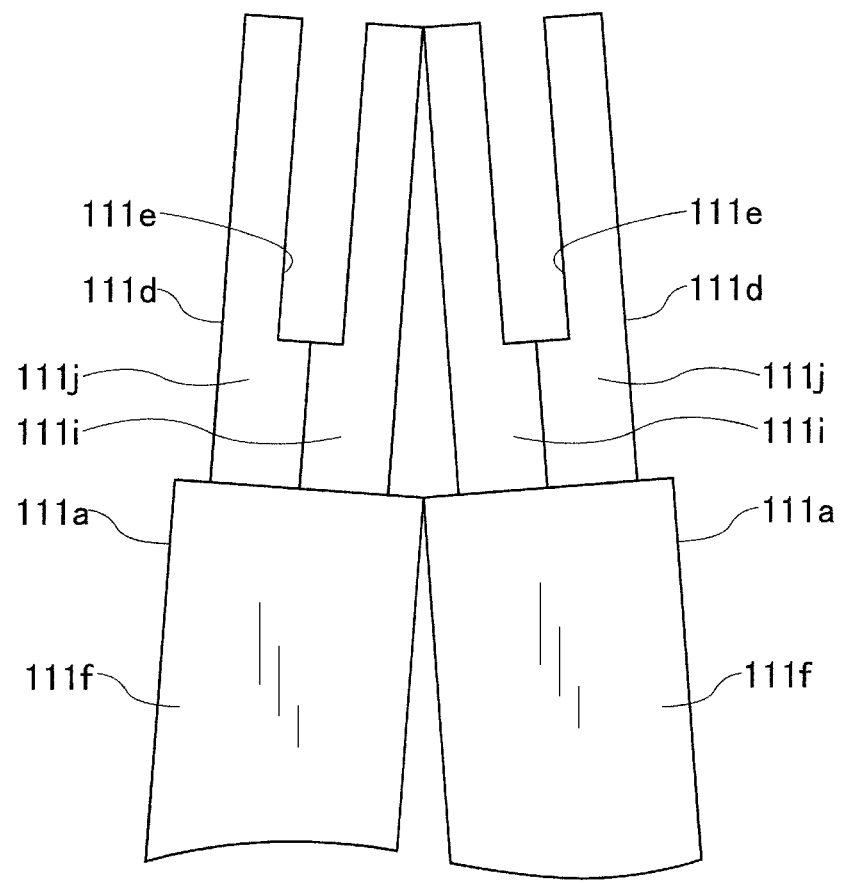
FIG. 22 is a front view of a pair of the insulated conductor segments according to the second embodiment, which are to be welded to each other.
Figure 23:
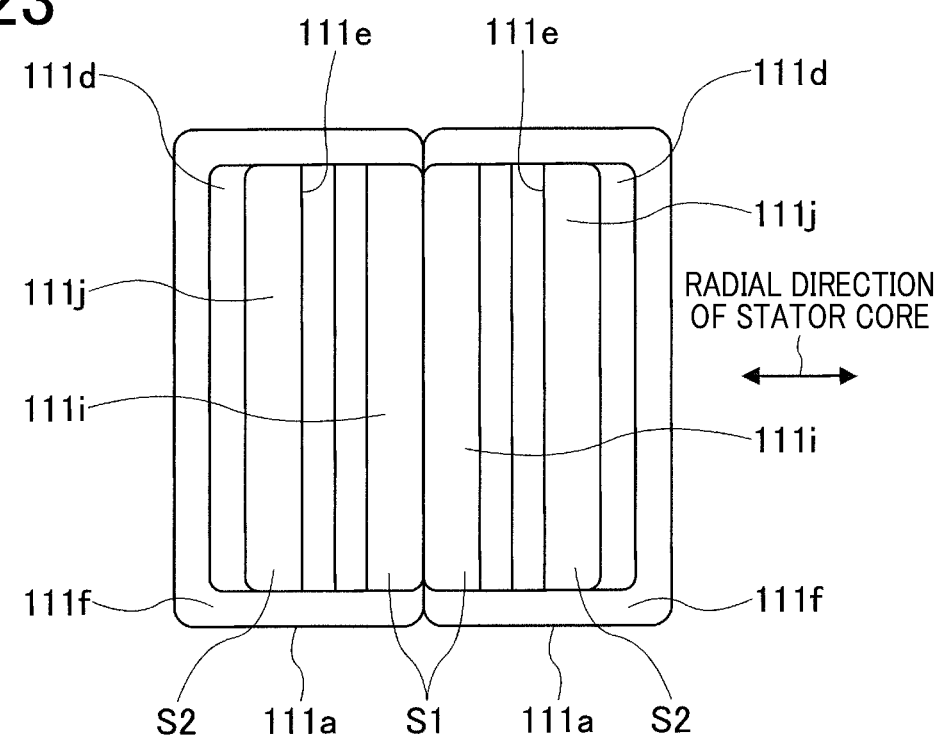
FIG. 23 is a top view of the pair of the insulated conductor segments shown in FIG. 22.

Furthermore, as shown in FIGS. 22 and 23, as in the first embodiment, the end portions of the electric conductors 111*d* are arranged so that when viewed along the axial direction of the stator core 110 (or along the direction perpendicular to the end surfaces of the end portions), the lengthwise direction of each of the slits 111*e* formed in the end portions of the electric conductors 111*d* is perpendicular to a radial direction of the stator core 110. Moreover, each pair of the end portions of the electric conductors 111*d* to be welded together are arranged so that: parts of the pair of the end portions of the electric conductors 111*d* adjoin each other in a radial direction of the stator core 110; and the two slits 111*e* formed respectively in the pair of the end portions of the electric conductors 111*d* extend parallel to each other. Then, the pair of the end portions of the electric conductors 111*d* are welded at the end surfaces thereof to form one of the welds 111*b* which covers the adjoining parts and the slits 111*e* of the pair of the end portions.

According to the present embodiment, it is possible to achieve the same advantageous effects as achievable according to the first embodiment.

Moreover, according to the present embodiment, as described above, each of the electric conductors 111*d* is constituted of a pair of electric conductor wires 111*i* and 111*j* arranged to adjoin each other. Therefore, by varying combination of the electric conductor wires, it is possible to vary the cross-sectional area of each of the electric conductors 111*d* while suppressing increase in the parts count of the rotating electric machine 1. Moreover, compared to the first embodiment where each of the electric conductors 111*d* is constituted of a single electric conductor wire 111*g*, it is possible to reduce the cross-sectional area of each electric conductor wire, thereby reducing the eddy current loss of each of the electric conductors 111*d*.

In addition, according to the present embodiment, as described above, in each of the end portions of the electric conductors 111*d*, the slit 111*e* is formed between the end portions of the electric conductor wires 111*i* and 111*j* which together constitute the end portion of the electric conductor 111*d*. In this manner, it is possible to easily form the slit 111*e*.

Third Embodiment

A rotating electric machine 1 according to a third embodiment has almost the same structure as the rotating electric machine 1 according to the first embodiment. Accordingly, the differences therebetween will be mainly described hereinafter.

In the first embodiment, each of the end portions of the electric conductors 111*d* has the slit 111*e* formed therein to divide the end surface of the end portion into two sections whose areas are equal to each other.

Figure 24:
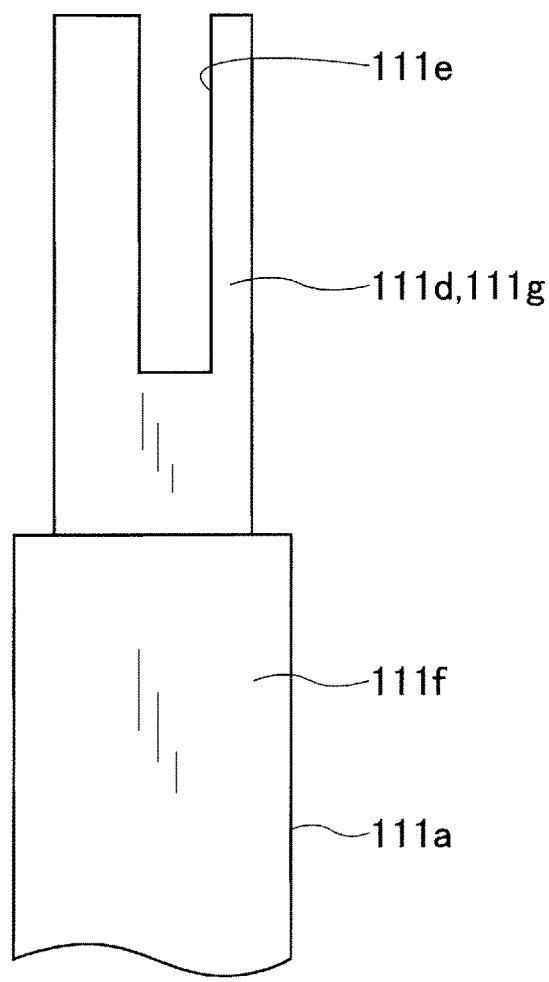
FIG. 24 is a front view of an end portion of one of insulated conductor segments according to a third embodiment.
Figure 25:
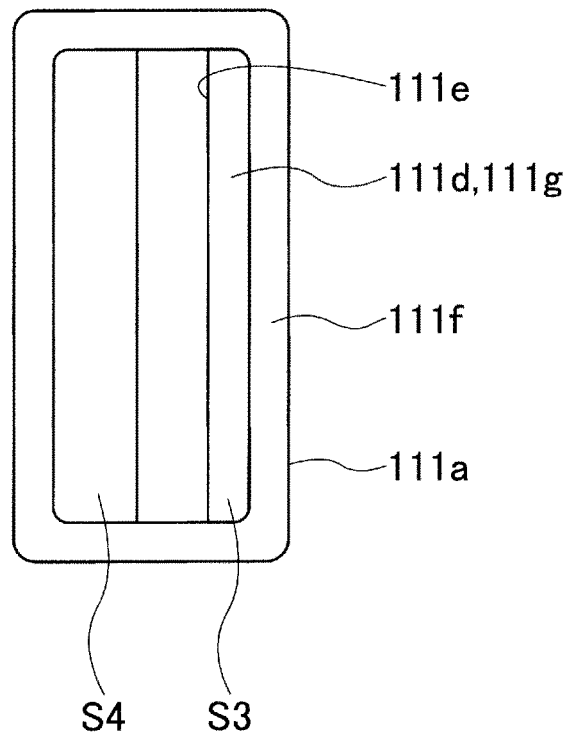
FIG. 25 is a top view of the end portion of the insulated conductor segment shown in FIG. 24.

In comparison, in the present embodiment, as shown in FIGS. 24 and 25, each of the end portions of the electric conductors 111*d* has the slit 111*e* formed therein to divide the end surface of the end portion into two sections whose areas are different from each other, i.e., a first section having an area S3 and a second section having an area S4, where S3<S4.

In addition, as in the first embodiment, each of the electric conductors 111*d* of the insulated conductor segments 111*a* is constituted of a single electric conductor wire 111*g* which has a substantially rectangular cross-sectional shape. In each of the end portions of the electric conductors 111*d*, the slit 111*e* is formed so that a lengthwise direction of the slit 111*e* is parallel to the longer sides of the substantially rectangular end surface of the end portion.

Figure 26:
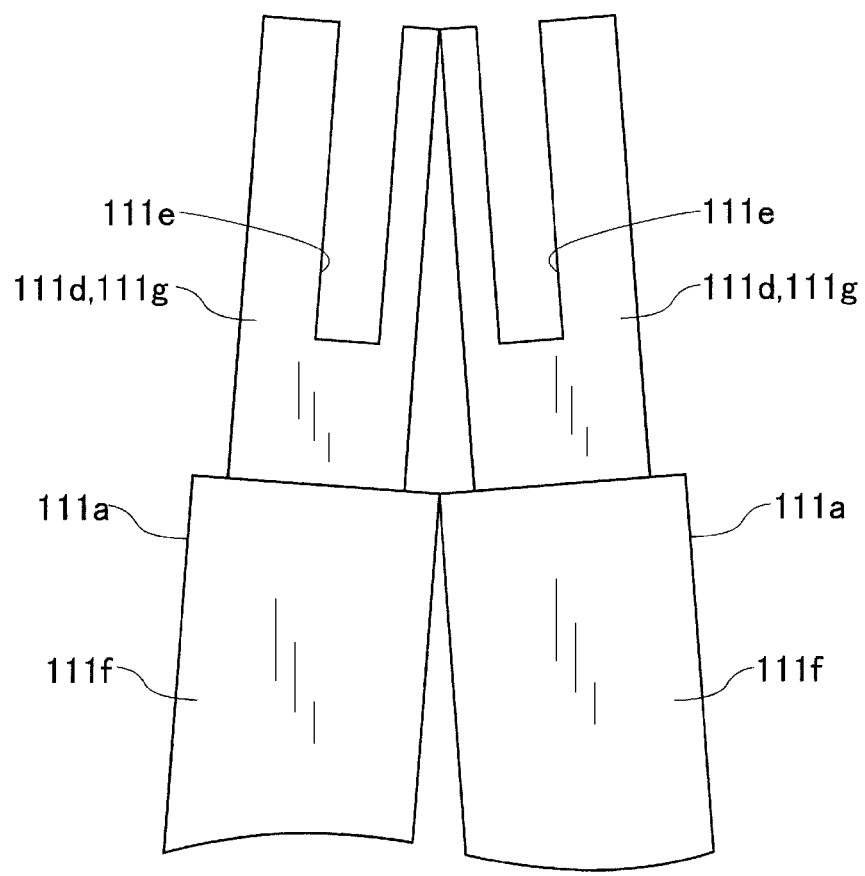
FIG. 26 is a front view of a pair of the insulated conductor segments according to the third embodiment, which are to be welded to each other.
Figure 27:
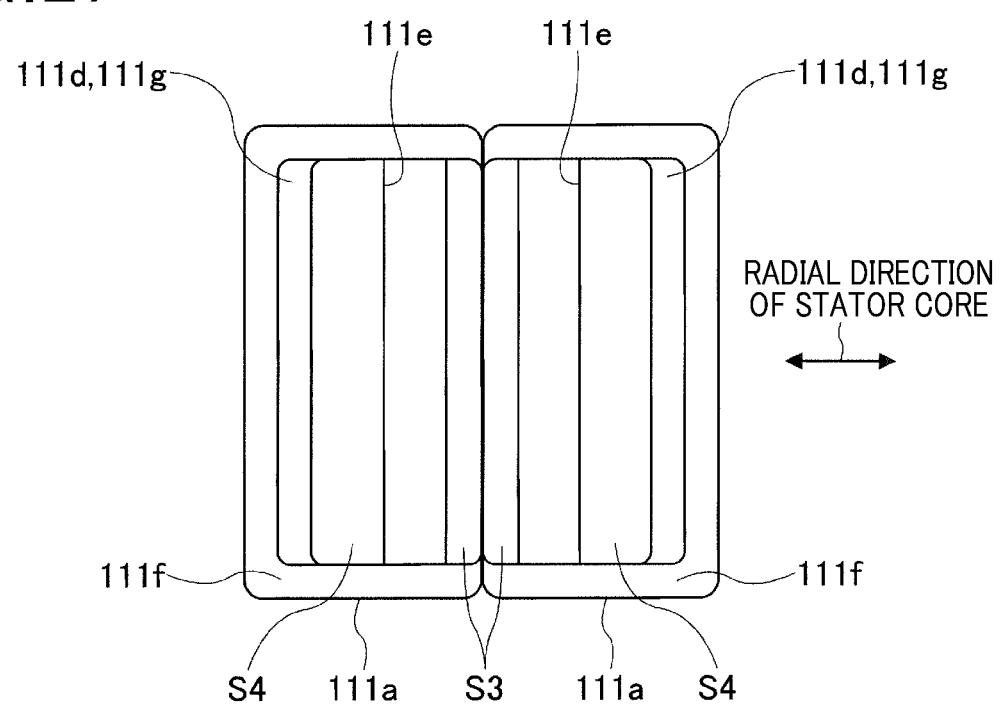
FIG. 27 is a top view of the pair of the insulated conductor segments shown in FIG. 26.

As shown in FIGS. 26 and 27, the end portions of the electric conductors 111*d* are arranged so that when viewed along the axial direction of the stator core 110 (or along the direction perpendicular to the end surfaces of the end portions), the lengthwise direction of each of the slits 111*e* formed in the end portions of the electric conductors 111*d* is perpendicular to a radial direction of the stator core 110. Moreover, each pair of the end portions of the electric conductors 111*d* to be welded together are arranged so that: parts of the pair of the end portions of the electric conductors 111*d* adjoin each other in a radial direction of the stator core 110; the two slits 111*e* formed respectively in the pair of the end portions of the electric conductors 111*d* extend parallel to each other; and the first sections of the end surfaces of the pair of the end portions adjoin each other in the radial direction of the stator core 110. That is, of the sections of the end surfaces divided by the respective slits 111*e*, the central sections (i.e., the first sections) have a smaller area than the outer sections (i.e., the second sections); the central sections are located closer than the outer sections to the boundary between the pair of the end portions of the electric conductors 111*d*. Then, the pair of the end portions of the electric conductors 111*d* are welded at the end surfaces thereof to form one of the welds 111*b* which covers the adjoining parts and the slits 111*e* of the pair of the end portions.

According to the present embodiment, it is possible to achieve the same advantageous effects as achievable according to the first embodiment.

Moreover, in welding each pair of the end portions of the electric conductors 111*d* arranged to adjoin each other, heat is applied so that temperature is higher at the central parts (i.e., the adjoining parts) than at the outer parts of the pair of the end portions. According to the present embodiment, as described above, each pair of the end portions of the electric conductors 111*d* are arranged so that the area S3 of the central sections (i.e., the first sections) is smaller than the area S4 of the outer sections (i.e., the second sections) of the end surfaces of the pair of the end portions. That is, the central parts of the pair of the end portions of the electric conductors 111*d* have a lower heat capacity than the outer parts of the same. Consequently, it is possible to reliably suppress the heat input to the pair of the end portions of the electric conductors 111*d* during the welding.

Fourth Embodiment

A rotating electric machine 1 according to a fourth embodiment has almost the same structure as the rotating electric machine 1 according to the third embodiment. Accordingly, the differences therebetween will be mainly described hereinafter.

In the third embodiment, each of the electric conductors 111*d* of the insulated conductor segments 111*a* is constituted of a single electric conductor wire 111*g*.

Figure 28:
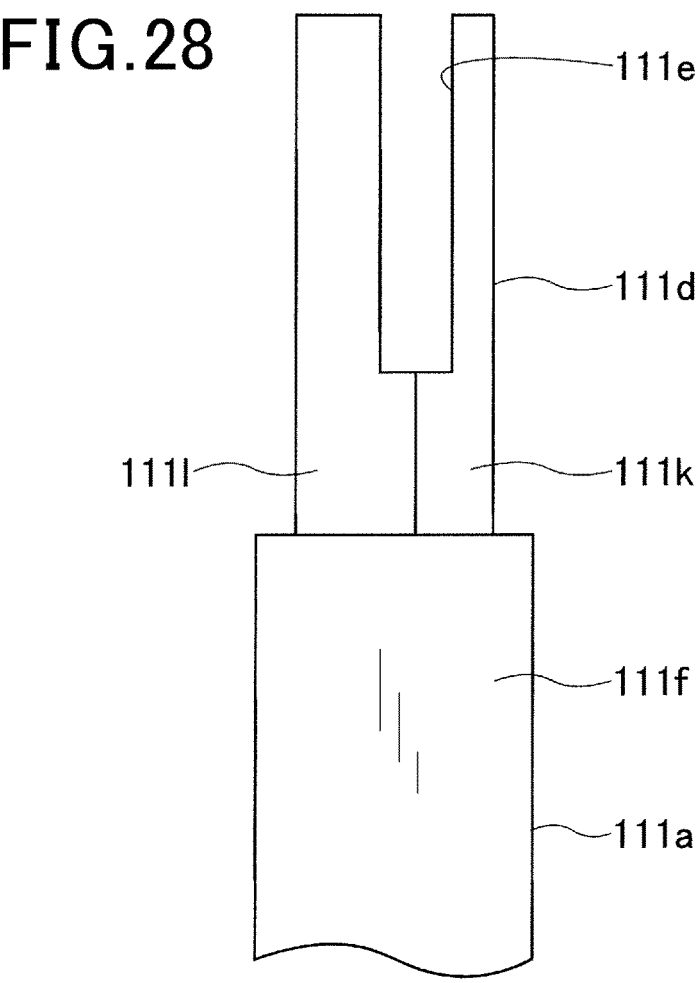
FIG. 28 is a front view of an end portion of one of insulated conductor segments according to a fourth embodiment.
Figure 29:
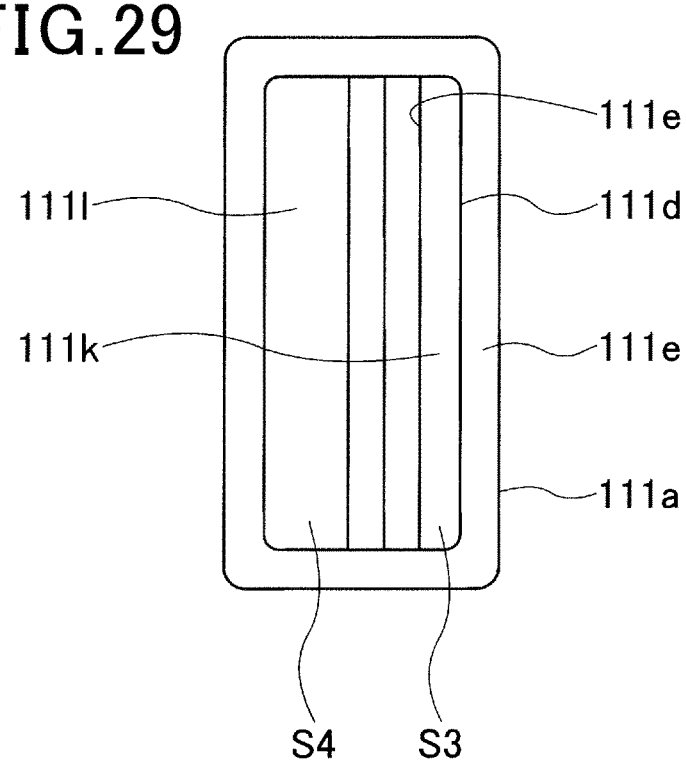
FIG. 29 is a top view of the end portion of the insulated conductor segment shown in FIG. 28.

In comparison, in the present embodiment, as shown in FIGS. 28 and 29, each of the electric conductors 111*d* of the insulated conductor segments 111*a* is constituted of a pair of electric conductor wires 111*k* and 111*l* arranged to adjoin (or abut) each other. The area of a cross section of the electric conductor wire 111*k* perpendicular to an axial direction (or longitudinal direction) of the electric conductor wire 111*k* is smaller than the area of a cross section of the electric conductor wire 111*l* perpendicular to an axial direction of the electric conductor wire 111*l*.

Moreover, each of the end portions of the electric conductor wires 111*k* and 111*l* has a cut formed in a side surface thereof. Each pair of the end portions of the electric conductor wires 111*k* and 111*l* are arranged so that the cuts formed in the pair of the end portions are continuous with each other. Consequently, the cuts together constitute one slit 111*e* that is formed in the end portion of the electric conductor 111*d*, which is constituted of the pair of the end portions of the electric conductor wires 111*k* and 111*l*, to divide the end surface of the end portion of the electric conductor 111*d* into first and second sections whose areas are different from each other. More specifically, the area S3 of the first section which is constituted of the end surface of the end portion of the electric conductor wire 111*k* is smaller than the area S4 of the second section which is constituted of the end surface of the end portion of the electric conductor wire 111*l*. In addition, as shown in FIG. 29, the slit 111*e* is formed between the pair of the end portions of the electric conductor wires 111*k* and 111*l* along a lengthwise direction of the substantially rectangular end surface of the end portion of the electric conductor 111*d*.

Figure 30:
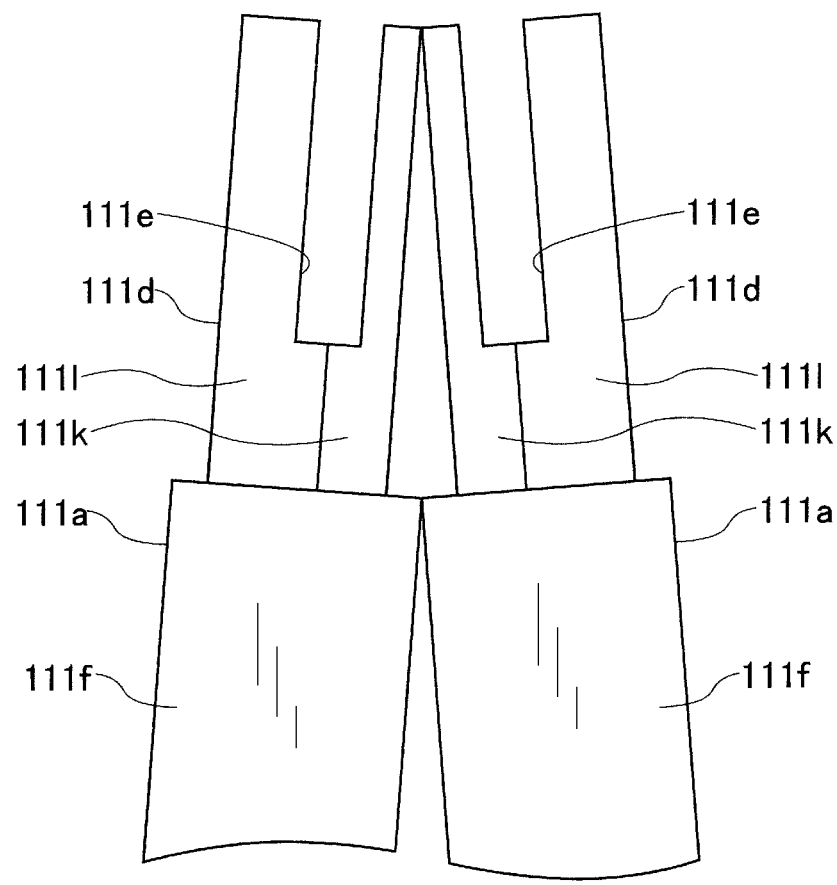
FIG. 30 is a front view of a pair of the insulated conductor segments according to the fourth embodiment, which are to be welded to each other.
Figure 31:
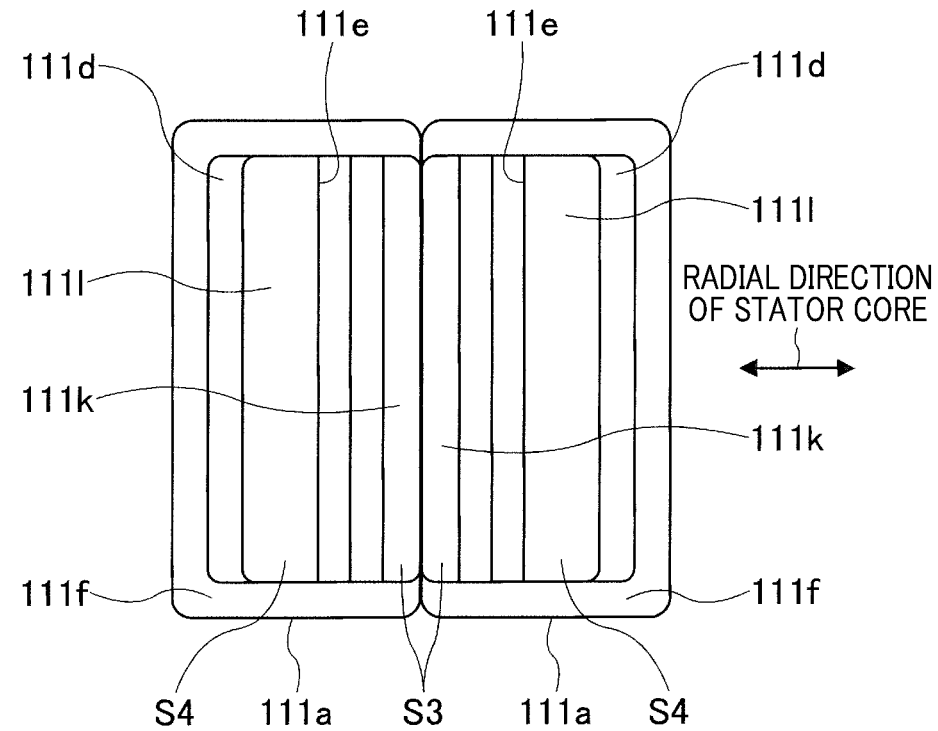
FIG. 31 is a top view of the pair of the insulated conductor segments shown in FIG. 30.

Furthermore, as shown in FIGS. 30 and 31, as in the third embodiment, the end portions of the electric conductors 111*d* are arranged so that when viewed along the axial direction of the stator core 110 (or along the direction perpendicular to the end surfaces of the end portions), the lengthwise direction of each of the slits 111*e* formed in the end portions of the electric conductors 111*d* is perpendicular to a radial direction of the stator core 110. Moreover, each pair of the end portions of the electric conductors 111*d* to be welded together are arranged so that: parts of the pair of the end portions of the electric conductors 111*d* adjoin each other in a radial direction of the stator core 110; the two slits 111*e* formed respectively in the pair of the end portions of the electric conductors 111*d* extend parallel to each other; and the first sections of the end surfaces of the pair of the end portions adjoin each other in the radial direction of the stator core 110. That is, of the sections of the end surfaces divided by the respective slits 111*e*, the central sections (i.e., the first sections which are respectively constituted of the end surfaces of the end portions of the electric conductor wires 111*k*) have a smaller area than the outer sections (i.e., the second sections which are respectively constituted of the end surfaces of the end portions of the electric conductor wires 111*l*); the central sections are located closer than the outer sections to the boundary between the pair of the end portions of the electric conductors 111*d*. Then, the pair of the end portions of the electric conductors 111*d* are welded at the end surfaces thereof to form one of the welds 111*b* which covers the adjoining parts and the slits 111*e* of the pair of the end portions.

According to the present embodiment, it is possible to achieve the same advantageous effects as achievable according to the third embodiment.

Moreover, according to the present embodiment, as described above, each of the electric conductors 111*d* is constituted of a pair of electric conductor wires 111*k* and 111*l* arranged to adjoin each other. Therefore, by varying combination of the electric conductor wires, it is possible to vary the cross-sectional area of each of the electric conductors 111*d* while suppressing increase in the parts count of the rotating electric machine 1. Moreover, compared to the third embodiment where each of the electric conductors 111*d* is constituted of a single electric conductor wire 111*g*, it is possible to reduce the cross-sectional area of each electric conductor wire, thereby reducing the eddy current loss of each of the electric conductors 111*d*.

In addition, according to the present embodiment, as described above, in each of the end portions of the electric conductors 111*d*, the slit 111*e* is formed between the end portions of the electric conductor wires 111*k* and 111*l* which together constitute the end portion of the electric conductor 111*d*. In this manner, it is possible to easily form the slit 111*e*.

Fifth Embodiment

A rotating electric machine 1 according to a fifth embodiment has almost the same structure as the rotating electric machine 1 according to the first embodiment. Accordingly, the differences therebetween will be mainly described hereinafter.

In the first embodiment, each of the end portions of the electric conductors 111*d* has a single slit 111*m* formed therein to divide the end surface of the end portion into two sections.

Figure 32:
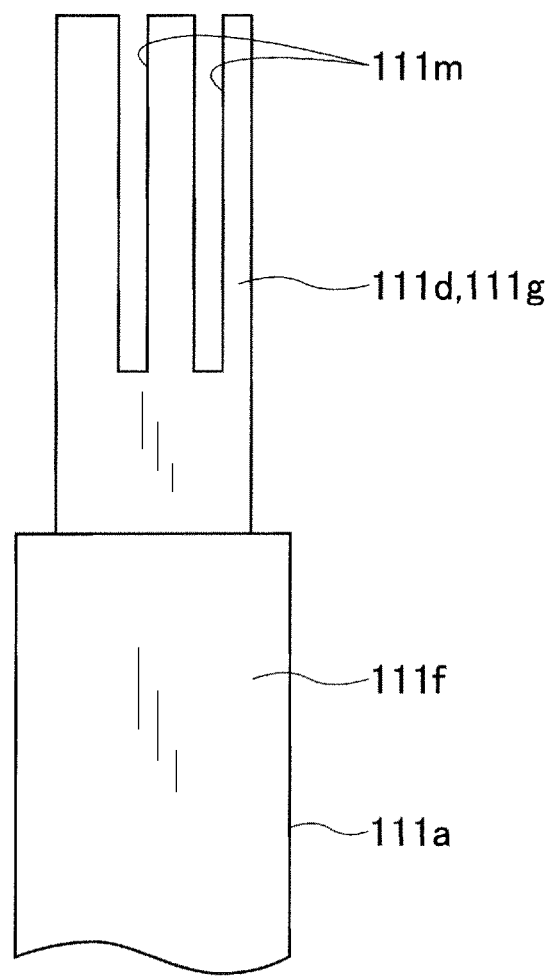
FIG. 32 is a front view of an end portion of one of insulated conductor segments according to a fifth embodiment.
Figure 33:
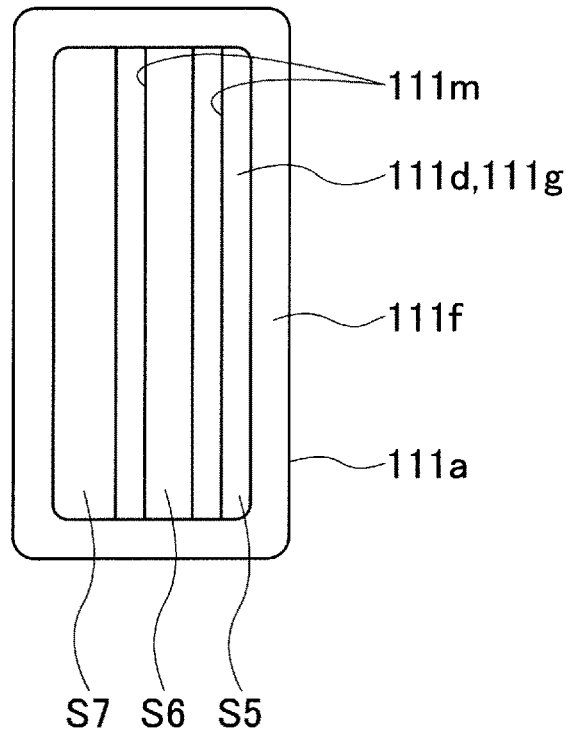
FIG. 33 is a top view of the end portion of the insulated conductor segment shown in FIG. 32.

In comparison, in the present embodiment, as shown in FIGS. 32 and 33, each of the end portions of the electric conductors 111*d* has two slits 111*m* formed therein to divide the end surface of the end portion into three sections whose areas are different from each other, i.e., a first section having an area S5, a second section having an area S6 and a third section having an area S7, where S5<S6<S7. The second section is located between the first and third sections, with one of the two slits 111*m* formed between the first and second sections and the other slit 111*m* formed between the second and third sections.

In addition, as in the first embodiment, each of the electric conductors 111*d* of the insulated conductor segments 111*a* is constituted of a single electric conductor wire 111*g* which has a substantially rectangular cross-sectional shape. In each of the end portions of the electric conductors 111*d*, the two slits 111*m* are formed so that a lengthwise direction of the slits 111*m* is parallel to the longer sides of the substantially rectangular end surface of the end portion.

Figure 34:
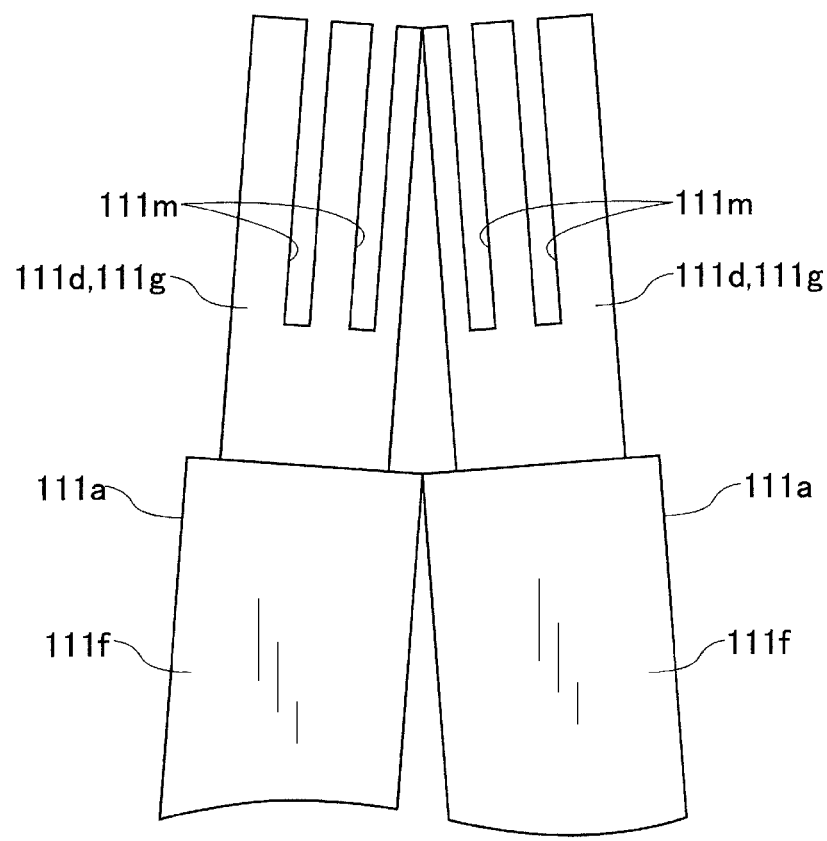
FIG. 34 is a front view of a pair of the insulated conductor segments according to the fifth embodiment, which are to be welded to each other.
Figure 35:
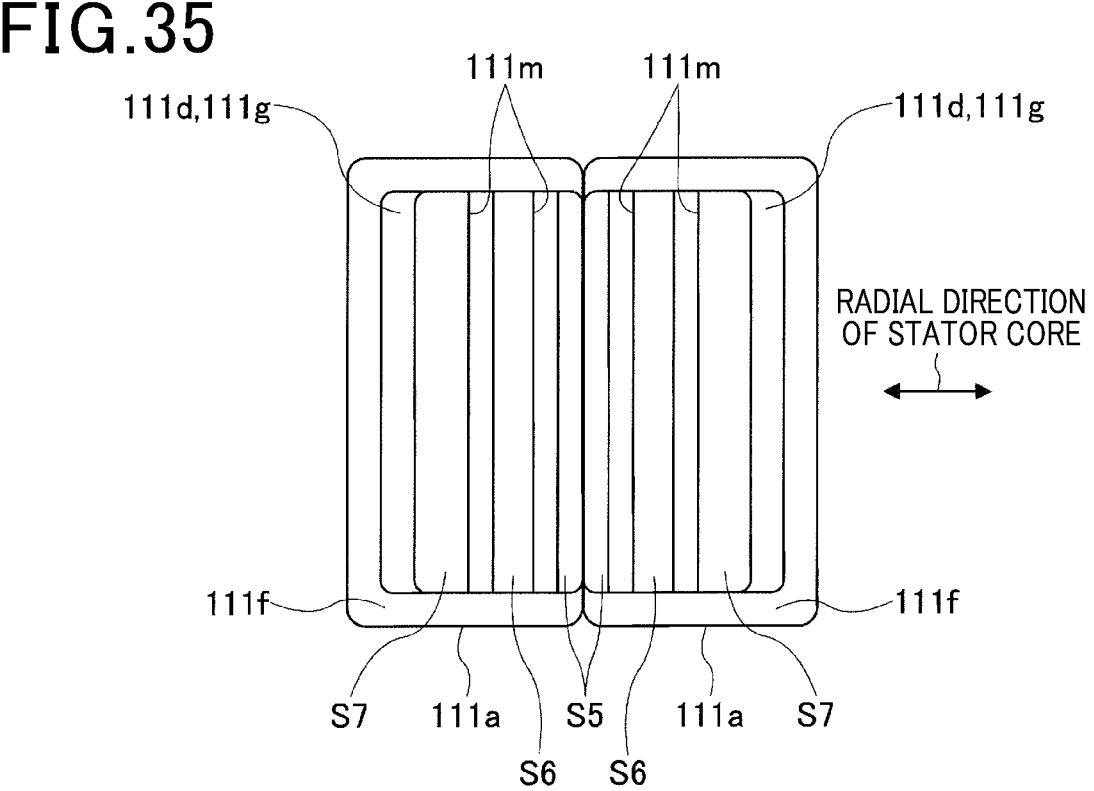
FIG. 35 is a top view of the pair of the insulated conductor segments shown in FIG. 34.

As shown in FIGS. 34 and 35, the end portions of the electric conductors 111*d* are arranged so that when viewed along the axial direction of the stator core 110 (or along the direction perpendicular to the end surfaces of the end portions), the lengthwise direction of each of the slits 111*m* formed in the end portions of the electric conductors 111*d* is perpendicular to a radial direction of the stator core 110. Moreover, each pair of the end portions of the electric conductors 111*d* to be welded together are arranged so that: parts of the pair of the end portions of the electric conductors 111*d* adjoin each other in a radial direction of the stator core 110; all of the slits 111*m* formed in the pair of the end portions of the electric conductors 111*d* extend parallel to each other; and the first sections of the end surfaces of the pair of the end portions adjoin each other in the radial direction of the stator core 110. That is, for each of the pair of the end portions of the electric conductors 111*d*, the first, second and third sections of the end surface of the end portion are arranged so that the areas S5, S6 and S7 of the three sections increase in a direction away from the boundary between the pair of the end portions of the electric conductors 111*d*. Then, the pair of the end portions of the electric conductors 111*d* are welded at the end surfaces thereof to form one of the welds 111b which covers the adjoining parts and the slits 111m of the pair of the end portions.

According to the present embodiment, it is possible to achieve the same advantageous effects as achievable according to the first embodiment.

Moreover, according to the present embodiment, as described above, each of the end portions of the electric conductors 111d has two slits 111m formed therein to divide the end surface of the end portion into three sections. That is, the number of the slits into which the molten metal mixture 111h flows during the welding is doubled in comparison with the first embodiment. Consequently, it is possible to more reliably prevent sagging of the molten metal mixture 111h during the welding.

Furthermore, according to the present embodiment, as described above, each pair of the end portions of the electric conductors 111d to be welded together are arranged so that for each of the pair of the end portions, the areas of the three sections of the end surface of the end portion increase in the direction away from the boundary between the pair of the end portions. That is, for each of the pair of the end portions, the heat capacities of the three parts of the end portion divided by the two slits 111m increase in the direction away from the boundary between the pair of the end portions. Consequently, during the welding of the pair of the end portions, it is possible to prevent the molten metal mixture 111h from rapidly growing and sagging outside the pair of the end portions.

Sixth Embodiment

A rotating electric machine 1 according to a sixth embodiment has almost the same structure as the rotating electric machine 1 according to the fifth embodiment. Accordingly, the differences therebetween will be mainly described hereinafter.

In the fifth embodiment, each of the electric conductors 111d of the insulated conductor segments 111a is constituted of a single electric conductor wire 111g.

Figure 36:
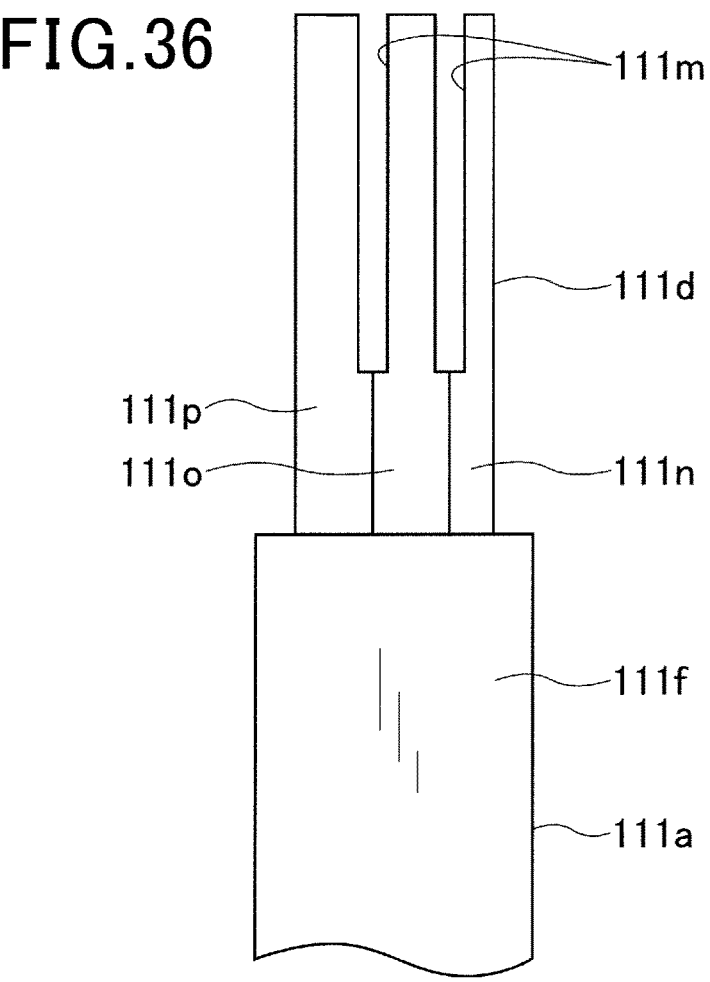
FIG. 36 is a front view of an end portion of one of insulated conductor segments according to a sixth embodiment.
Figure 37:
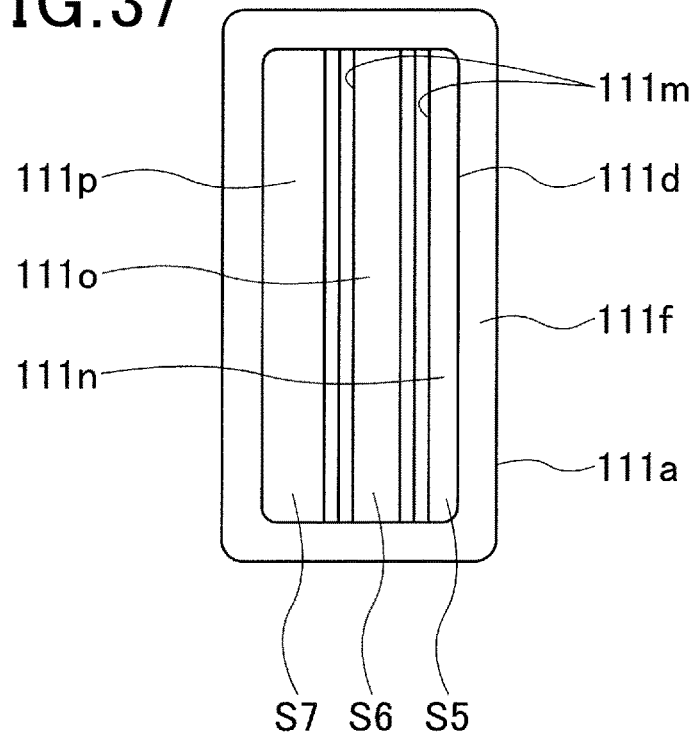
FIG. 37 is a top view of the end portion of the insulated conductor segment shown in FIG. 36.

In comparison, in the present embodiment, as shown in FIGS. 36 and 37, each of the electric conductors 111d of the insulated conductor segments 111a is constituted of three electric conductor wires 111n, 111o and 111p arranged to adjoin (or abut) one another. The area of a cross section of the electric conductor wire 111n perpendicular to an axial direction (or longitudinal direction) of the electric conductor wire 111n is smaller than the area of a cross section of the electric conductor wire 111o perpendicular to an axial direction of the electric conductor wire 111o; and the area of the cross section of the electric conductor wire 111o is smaller than the area of a cross section of the electric conductor wire 111p perpendicular to an axial direction of the electric conductor wire 111p.

Moreover, each of the end portions of the electric conductor wires 111n and 111p has a cut formed in a side surface thereof, while each of the end portions of the electric conductor wire 111o has two cuts formed respectively in opposite side surfaces thereof. Each trio of the end portions of the electric conductor wires 111n, 111o and 111p are arranged so that the cuts formed in the trio of the end portions together constitute two slits 111m. The two slits 111m are formed in the end portion of the electric conductor 111d, which is constituted of the trio of the end portions of the electric conductor wires 111n, 111o and 111p, to divide the end surface of the end portion of the electric conductor 111d into three sections whose areas are different from each other. More specifically, the area S5 of the first section which is constituted of the end surface of the end portion of the electric conductor wire 111n is smaller than the area S6 of the second section which is constituted of the end surface of the end portion of the electric conductor wire 111o; and the area S6 of the second section is smaller than the area S7 of the third section which is constituted of the end surface of the end portion of the electric conductor wire 111p. The second section is located between the first and third sections, with one of the two slits 111m formed between the first and second sections and the other slit 111m formed between the second and third sections. In addition, as shown in FIG. 37, the two slits 111m are formed between the end portions of the electric conductor wires 111n, 111o and 111p along a lengthwise direction of the substantially rectangular end surface of the end portion of the electric conductor 111d.

Figure 38:
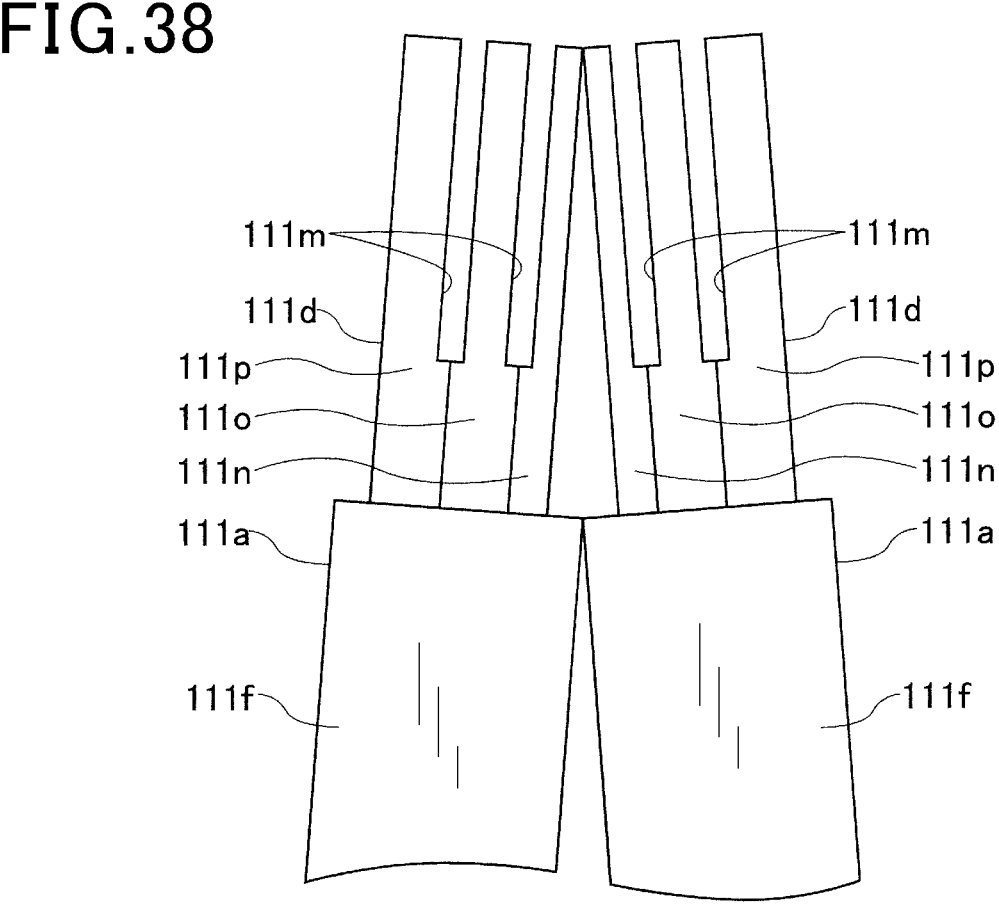
FIG. 38 is a front view of a pair of the insulated conductor segments according to the sixth embodiment, which are to be welded to each other.
Figure 39:
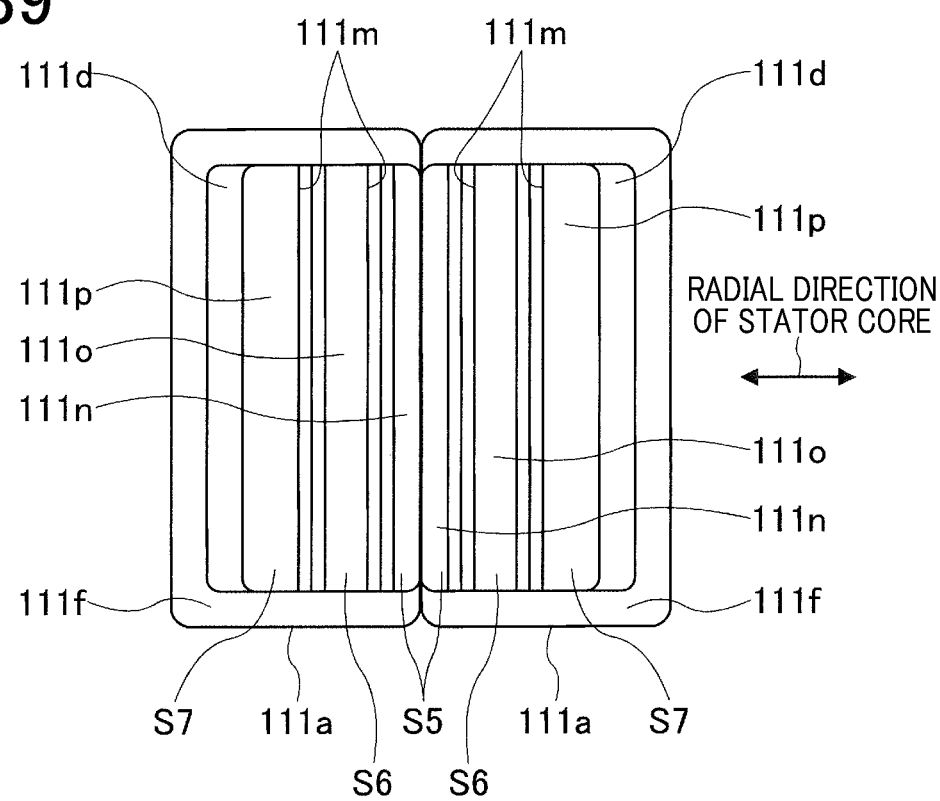
FIG. 39 is a top view of the pair of the insulated conductor segments shown in FIG. 38.

Furthermore, as shown in FIGS. 38 and 39, as in the fifth embodiment, the end portions of the electric conductors 111d are arranged so that when viewed along the axial direction of the stator core 110 (or along the direction perpendicular to the end surfaces of the end portions), the lengthwise direction of each of the slits 111m formed in the end portions of the electric conductors 111d is perpendicular to a radial direction of the stator core 110. Moreover, each pair of the end portions of the electric conductors 111d to be welded together are arranged so that: parts of the pair of the end portions of the electric conductors 111d adjoin each other in a radial direction of the stator core 110; all of the slits 111m formed in the pair of the end portions of the electric conductors 111d extend parallel to each other; and the first sections of the end surfaces of the pair of the end portions adjoin each other in the radial direction of the stator core 110. That is, for each of the pair of the end portions of the electric conductors 111d, the first, second and third sections of the end surface of the end portion are arranged so that the areas S5, S6 and S7 of the three sections increase in a direction away from the boundary between the pair of the end portions of the electric conductors 111d. Then, the pair of the end portions of the electric conductors 111d are welded at the end surfaces thereof to form one of the welds 111b which covers the adjoining parts and the slits 111m of the pair of the end portions.

According to the present embodiment, it is possible to achieve the same advantageous effects as achievable according to the fifth embodiment.

Moreover, according to the present embodiment, as described above, each of the electric conductors 111d is constituted of three electric conductor wires 111n, 111o and 111p arranged to adjoin one another. Therefore, by varying combination of the electric conductor wires, it is possible to vary the cross-sectional area of each of the electric conductors 111d while suppressing increase in the parts count of the rotating electric machine 1. Moreover, compared to the fifth embodiment where each of the electric conductors 111d is constituted of a single electric conductor wire 111g, it is possible to reduce the cross-sectional area of each electric conductor wire, thereby reducing the eddy current loss of each of the electric conductors 111d.

In addition, according to the present embodiment, as described above, in each of the end portions of the electric conductors 111d, the two slits 111m are formed between the end portions of the electric conductor wires 111n, 111o and 111p which together constitute the end portion of the electric conductor 111d. In this manner, it is possible to easily form the slit 111e.

While the above particular embodiments have been shown and described, it will be understood by those skilled in the art that the present invention can also be embodied in various other modes without departing from the spirit of the present invention.

For example, in the first to the sixth embodiments, each of the welds 111b is formed between two of the end portions of the electric conductors 111d. However, each of the welds 111b may also be formed between three or more of the end portions of the electric conductors 111d. In other words, it is also possible to arrange three or more of the end portions of the electric conductors 111d to adjoin one another and weld them together to form one of the welds 111b therebetween.

In the first to the sixth embodiments, for each pair of the end portions of the electric conductors 111d to be welded together, both the end portions of the pair each have one or two slits formed therein. However, it is also possible to form at least one slit in at least one of the end portions of the pair.

In the first to the sixth embodiments, each of the end portions of the electric conductors 111d has one or two slits formed therein to divide the end surface of the end portion into two or three sections. However, each of the end portions of the electric conductors 111d may also have three or more slits formed therein to divide the end surface of the end portion into four or more sections.

In the second, fourth and sixth embodiments, each of the electric conductors 111d is constituted of two or three electric conductor wires arranged to adjoin one another. However, each of the electric conductors 111d may also be constituted of four or more electric conductor wires arranged to adjoin one another. Moreover, each of the electric conductor wires may have an insulating member covering the outer surface thereof, thereby improving the insulation performance of the electric conductors 111d. Furthermore, it is preferable to weld the end portions of the electric conductors 111d with all the insulating members removed therefrom, thereby preventing gaseous matter from being generated during the welding due to the melting of the insulating members. Consequently, it would be possible to prevent blow holes from being created in the welds 111b formed between the end portions of the electric conductors 111d due to gaseous matter generated and remaining therein. As a result, it would be possible to ensure high strength of the welds 111b.

Figure 40:
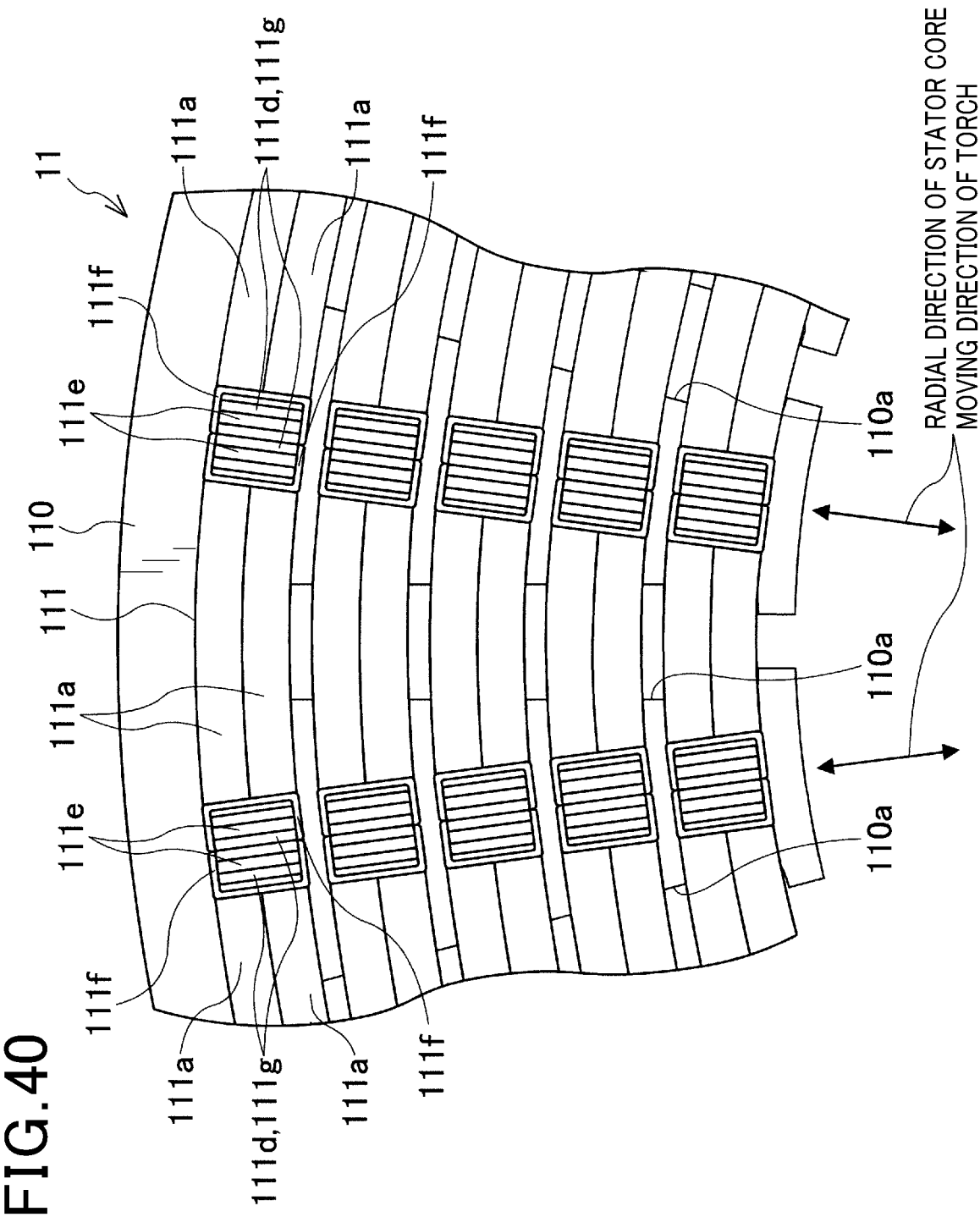
FIG. 40 is an axial end view of part of a stator according to a modification before end portions of insulated conductor segments are welded.

In the first to the sixth embodiments, the end portions of the electric conductors 111d are arranged so that when viewed along the axial direction of the stator core 110 (or along the direction perpendicular to the end surfaces of the end portions), the lengthwise direction of each of the slits formed in the end portions of the electric conductors 111d is perpendicular to a radial direction of the stator core 110. However, as shown in FIG. 40, the end portions of the electric conductors 111d may alternatively be arranged so that when viewed along the axial direction of the stator core 110, the lengthwise direction of each of the slits formed in the end portions of the electric conductors 111d is parallel to a radial direction of the stator core 110. In this case, it is possible to weld each pair of the end portions of the electric conductors 111d along the lengthwise direction of the slits 111e formed therein while moving the torch T in the radial direction of the stator core 110.

In the first to the sixth embodiments, the present invention is directed to the rotating electric machine 1 which is configured as a motor-generator for use in a motor vehicle. However, the present invention can also be applied to other rotating electric machines, such as an electric motor or an electric generator.

What is claimed is:

1. A rotating electric machine comprising:
a pair of electric conductors forming a coil, each of the pair of electric conductors being constituted by a plurality of electric conductor wires arranged to adjoin one another, each of the pair of electric conductors having an end portion with an end surface, the end portions of the pair of electric conductors being arranged so that parts of the end portions of the electric conductors adjoin each other, at least one end portion of the end portions of the electric conductors having at least one slit formed in the at least one of the end portions to divide the end surface of the at least one end portion into a plurality of sections; and
a weld formed between the end portions of the pair of electric conductors at the end surfaces of the end portions, the weld being formed to cover at least the adjoining parts of the end portions of the electric conductors and the at least one slit.

2. The rotating electric machine as set forth in claim 1, wherein the at least one end portion of the end portions of the electric conductors has a plurality of slits formed in the at least one end portion to divide the end surface of the at least one end portion into three or more sections.

3. The rotating electric machine as set forth in claim 1, wherein:
each of the electric conductor wires has an end surface and the end surfaces of the electric conductor wires together constitute the end surface of the electric conductor, and
areas of the end surfaces of the electric conductor wires are different from each other.

4. The rotating electric machine as set forth in claim 1, wherein the at least one slit is formed between the plurality of electric conductor wires.

5. The rotating electric machine as set forth in claim 1, further comprising an annular core holding the coil, the pair of electric conductors being arranged so that the end portions of the pair of electric conductors protrude from an axial end face of the annular core and a lengthwise direction of the at least one slit is perpendicular to a radial direction of the annular core.

6. A rotating electric machine comprising:
a pair of electric conductors forming a coil, each of the pair of electric conductors having an end portion with an end surface, the end portions of the electric conductors being arranged so that parts of the end portions of the electric conductors adjoin each other, at least one end portion of the pair of end portions of the electric conductors having a plurality of slits formed in the at least one end portion to divide the end surface of the at least one end portion into three or more sections, and areas of the three or more sections of the end surface increase in a direction away from a boundary between the end portions of the pair of electric conductors, wherein from the three or more sections of the end surface divided by the plurality of slits, a central section has a smaller area than an area of an outer section, the central section being located closer than the outer section to the boundary between the end portions of the electric conductors; and
a weld formed between the end portions of the pair of electric conductors at the end surfaces of the end portions, the weld being formed to cover at least the adjoining parts of the end portions of the electric conductors and the at least one slit.

7. A method of manufacturing a rotating electric machine, the method comprising steps of:

preparing a pair of electric conductors forming a coil of the rotating electric machine, each of the electric conductors being constituted by a plurality of electric conductor wires arranged to adjoin one another, and each of the electric conductors having an end portion with an end surface;

forming at least one slit in at least one end portion of the end portions of the pair of electric conductors to divide the end surface of the at least one end portion into a plurality of sections;

arranging the end portions of the pair of electric conductors so that parts of the end portions of the pair of electric conductors adjoin each other; and welding the end portions of the pair of electric conductors at the end surfaces of the end portions to form a weld that covers at least the adjoining parts of the end portions and the at least one slit.

8. The method as set forth in claim 7, wherein, in the forming step, the at least one slit includes a plurality of slits that are formed in the at least one of the end portions of the pair of electric conductors to divide the end surface of the end portion into three or more sections.

9. The method as set forth in claim 7, wherein:

each of the electric conductor wires has an end surface and the end surfaces of the electric conductor wires together constitute the end surface of the electric conductor, and areas of the end surfaces of the pair of electric conductor wires are different from each other.

10. The method as set forth in claim 7, wherein, in the forming step, the at least one slit is formed between the plurality of electric conductor wires.

11. The method as set forth in claim 7, wherein, in the arranging step, the pair of electric conductors are mounted to an annular core of the rotating electric machine and arranged so that the end portions of the electric conductors protrude from an axial end face of the annular core and a lengthwise direction of the at least one slit is perpendicular to a radial direction of the annular core.

12. A method of manufacturing a rotating electric machine, the method comprising steps of:

preparing a pair of electric conductors forming a coil of the rotating electric machine, each of the electric conductors having an end portion with an end surface;

forming a plurality of slits in at least one end portion of the end portions of the pair of electric conductors to divide the end surface of the at least one end portion into three or more sections;

arranging the end portions of the pair of electric conductors so that parts of the end portions of the pair of electric conductors adjoin each other; and welding the end portions of the pair of electric conductors at the end surfaces of the end portions to form a weld that covers at least the adjoining parts of the end portions and the at least one slit, wherein:

the plurality of slits are formed in the forming step and the end portions of the electric conductors are arranged in the arranging step so that areas of the sections of the end surface increase in a direction away from a boundary between the end portions of the pair of electric conductors.

* * * * *